US010013576B2

(12) United States Patent
Maeda et al.

(10) Patent No.: US 10,013,576 B2
(45) Date of Patent: Jul. 3, 2018

(54) HISTORY INFORMATION ANONYMIZATION METHOD AND HISTORY INFORMATION ANONYMIZATION DEVICE FOR ANONYMIZING HISTORY INFORMATION

(71) Applicant: Panasonic Intellectual Property Management Co., Ltd., Osaka (JP)

(72) Inventors: Manabu Maeda, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 14/946,531

(22) Filed: Nov. 19, 2015

(65) Prior Publication Data

US 2016/0171243 A1  Jun. 16, 2016

(30) Foreign Application Priority Data

Dec. 12, 2014  (JP) ................................. 2014-252303
Aug. 26, 2015  (JP) ................................. 2015-167039

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

| 8,332,959 B2 * | 12/2012 | Chen ................ G06Q 10/10 706/52 |
| 2003/0188171 A1 * | 10/2003 | DeCenzo ............. H04H 60/33 713/185 |
| 2007/0255643 A1 * | 11/2007 | Capuano .............. G06Q 30/00 705/37 |
| 2008/0177994 A1 * | 7/2008 | Mayer .................. G06F 9/4418 713/2 |

(Continued)

FOREIGN PATENT DOCUMENTS

WO  2011/142327  11/2011

OTHER PUBLICATIONS

Latanya Sweeney "K-Anonymity : A Model for Protecting Privacy" International Journal on Uncertainty, Fuzziness and Knowledge-Based Systems, 10(5), 2002.

*Primary Examiner* — Simon P Kanaan
(74) *Attorney, Agent, or Firm* — Greenblum & Bernstein, P.L.C.

(57) ABSTRACT

A history information anonymization method is provided that includes associating each of a plurality of pieces of history information collected from a plurality of TVs in a current cycle with a temporary ID associated with a TV at a collection destination. The method also includes getting together a plurality of IDs into a plurality of groups such that for the IDs in each group, contents of history information associated in the current cycle and in a past cycle are identical. The method further includes judging whether each of the plurality of groups satisfies anonymity, and changing only some of the plurality of temporary IDs associated with the plurality of TVs, when it is judged that any of the plurality of groups does not satisfy anonymity.

8 Claims, 31 Drawing Sheets

(56) References Cited

U.S. PATENT DOCUMENTS

| | | | | |
|---|---|---|---|---|
| 2009/0254572 | A1* | 10/2009 | Redlich | G06Q 10/06 |
| 2011/0178943 | A1* | 7/2011 | Motahari | G06F 21/6254 |
| | | | | 705/325 |
| 2013/0269038 | A1* | 10/2013 | Takahashi | H04L 9/32 |
| | | | | 726/26 |
| 2014/0172854 | A1* | 6/2014 | Huang | G06F 21/6245 |
| | | | | 707/737 |
| 2016/0171243 | A1* | 6/2016 | Maeda | G06F 21/6254 |
| | | | | 726/27 |
| 2016/0350557 | A1* | 12/2016 | Mikami | G06F 21/6254 |

\* cited by examiner

| USER ID | TIME t | TIME t + 1 | TIME t + 2 | TIME t + 3 |
|---|---|---|---|---|
| UID1 | 2ch | 8ch | 4ch | 7ch |
| UID2 | 2ch | 8ch | 4ch | 7ch |
| UID3 | 2ch | 8ch | 4ch | 7ch |
| UID4 | 2ch | 8ch | 4ch | – |
| UID5 | – | 8ch | 4ch | 7ch |
| UID6 | 2ch | 10ch | 6ch | 8ch |
| UID7 | 4ch | 10ch | 6ch | 8ch |
| UID8 | 4ch | 10ch | 6ch | 8ch |
| UID9 | 4ch | 10ch | 6ch | 7ch |
| UID10 | – | 10ch | 6ch | 8ch |

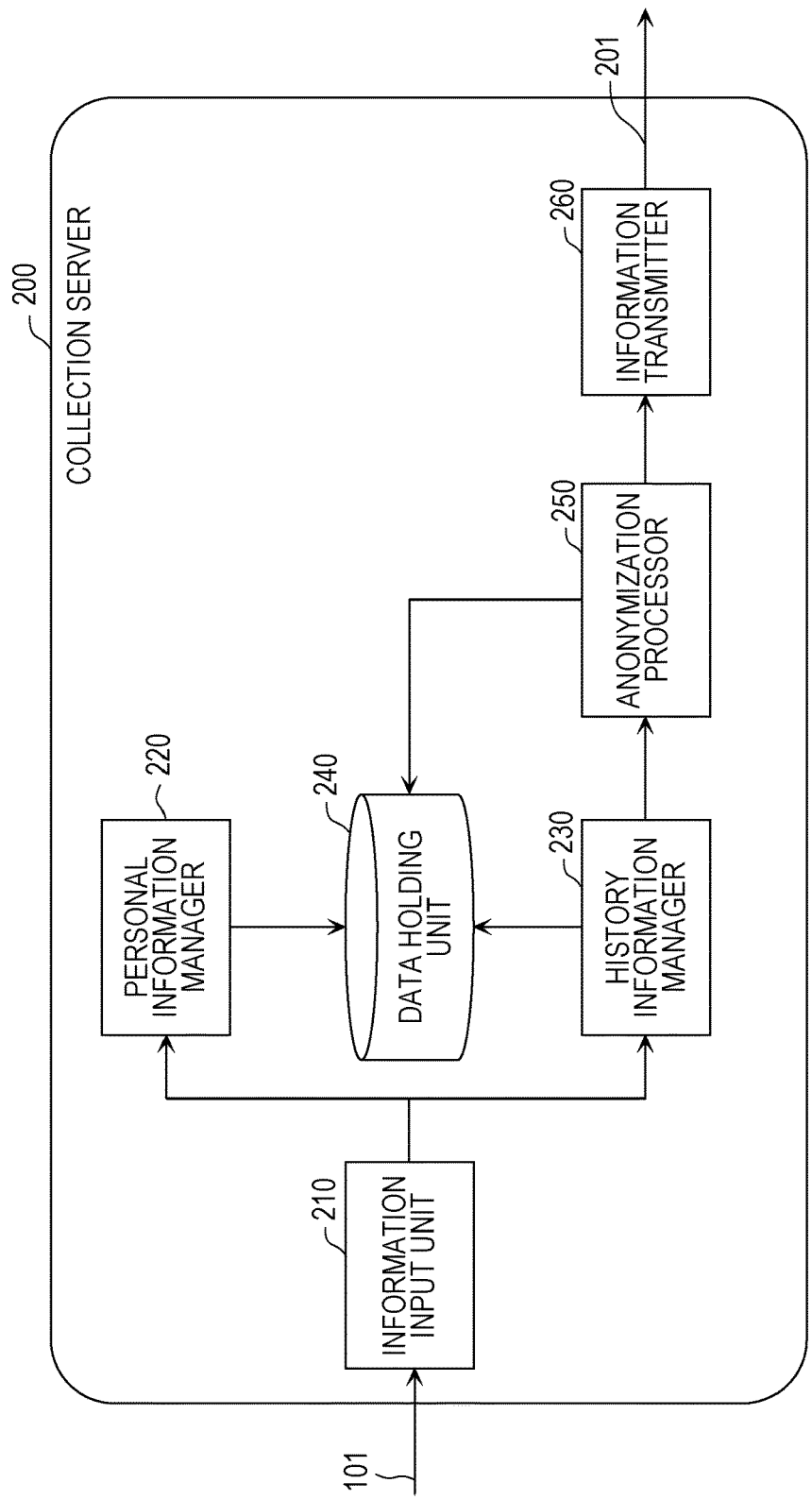

FIG. 5

| TEMPORARY ID | GROUP ID | TRANSMISSION ENABLED/DISABLED FLAG | WATCH HISTORY | | |
|---|---|---|---|---|---|
| ID1 | GID1 | ENABLED | 2ch | 8ch | 4ch | 7ch |
| ID2 | GID1 | ENABLED | 2ch | 8ch | 4ch | 7ch |
| ID3 | GID1 | ENABLED | 2ch | 8ch | 4ch | 7ch |
| ID4 | GID2 | ENABLED | 2ch | - | - | - |
| ID5 | GID2 | ENABLED | 2ch | - | - | - |
| ID6 | GID3 | ENABLED | 4ch | 10ch | 6ch | - |
| ID7 | GID3 | ENABLED | 4ch | 10ch | 6ch | - |
| ID8 | GID3 | ENABLED | 4ch | 10ch | 6ch | - |
| ID9 | GID4 | ENABLED | - | 8ch | 4ch | - |
| ID10 | GID5 | ENABLED | - | 10ch | 6ch | 8ch |
| ID11 | GID4 | ENABLED | - | 8ch | 4ch | - |
| ID12 | GID5 | ENABLED | - | 10ch | 6ch | 8ch |
| ID13 | GID6 | ENABLED | - | - | - | 7ch |
| ID14 | GID6 | ENABLED | - | - | - | 7ch |
| ID15 | GID7 | ENABLED | - | - | - | 8ch |
| ID16 | GID7 | ENABLED | - | - | - | 8ch |

FIG. 6

| USER ID | TEMPORARY ID | TEMPORARY ID HISTORY |
|---|---|---|
| UID1 | ID1 | ID1 |
| UID2 | ID2 | ID2 |
| UID3 | ID3 | ID3 |
| UID4 | ID11 | ID4, ID11 |
| UID5 | ID13 | ID9, ID13 |
| UID6 | ID12 | ID5, ID12 |
| UID7 | ID15 | ID6, ID15 |
| UID8 | ID16 | ID7, ID16 |
| UID9 | ID14 | ID8, ID14 |
| UID10 | ID10 | ID10 |

FIG. 14

| USER ID | TIME t | TIME t + 1 | TIME t + 2 | TIME t + 3 |
|---|---|---|---|---|
| UID1 | 2ch | | | |
| UID2 | 2ch | | | |
| UID3 | 2ch | | | |
| UID4 | 2ch | | | |
| UID5 | – | | | |
| UID6 | 2ch | | | |
| UID7 | 4ch | | | |
| UID8 | 4ch | | | |
| UID9 | 4ch | | | |
| UID10 | – | | | |

FIG. 16

| TEMPORARY ID 401 | GROUP ID 402 | TRANSMISSION ENABLED/DISABLED FLAG 403 | WATCH HISTORY 404 |
|---|---|---|---|
| ID1 | GID1 | ENABLED | 2ch |
| ID2 | GID1 | ENABLED | 2ch |
| ID3 | GID1 | ENABLED | 2ch |
| ID4 | GID1 | ENABLED | 2ch |
| ID5 | GID1 | ENABLED | 2ch |
| ID6 | GID2 | ENABLED | 4ch |
| ID7 | GID2 | ENABLED | 4ch |
| ID8 | GID2 | ENABLED | 4ch |

| USER ID | TIME t | TIME t + 1 | TIME t + 2 | TIME t + 3 |
|---|---|---|---|---|
| UID1 | 2ch | 8ch | | |
| UID2 | 2ch | 8ch | | |
| UID3 | 2ch | 8ch | | |
| UID4 | 2ch | 8ch | | |
| UID5 | – | 8ch | | |
| UID6 | 2ch | 10ch | | |
| UID7 | 4ch | 10ch | | |
| UID8 | 4ch | 10ch | | |
| UID9 | 4ch | 10ch | | |
| UID10 | – | 10ch | | |

FIG. 18

| TEMPORARY ID | GROUP ID | TRANSMISSION ENABLED/DISABLED FLAG | | WATCH HISTORY |
|---|---|---|---|---|
| 401 | 402 | 403 | | 404 |
| ID1 | GID1 | ENABLED | 2ch | 8ch |
| ID2 | GID1 | ENABLED | 2ch | 8ch |
| ID3 | GID1 | ENABLED | 2ch | 8ch |
| ID4 | GID1 | ENABLED | 2ch | 8ch |
| ID5 | GID3 | ENABLED | 2ch | 10ch |
| ID6 | GID2 | ENABLED | 4ch | 10ch |
| ID7 | GID2 | ENABLED | 4ch | 10ch |
| ID8 | GID2 | ENABLED | 4ch | 10ch |
| ID9 | GID4 | ENABLED | — | 8ch |
| ID10 | GID5 | ENABLED | — | 10ch |

| TEMPORARY ID | GROUP ID | TRANSMISSION ENABLED/DISABLED FLAG | WATCH HISTORY | |
|---|---|---|---|---|
| 401 | 402 | 403 | 404 | 400 |
| ID1 | GID1 | ENABLED | 2ch | 8ch |
| ID2 | GID1 | ENABLED | 2ch | 8ch |
| ID3 | GID1 | ENABLED | 2ch | 8ch |
| ID4 | GID3 | ENABLED | 2ch | — |
| ID5 | GID3 | ENABLED | 2ch | — |
| ID6 | GID2 | ENABLED | 4ch | 10ch |
| ID7 | GID2 | ENABLED | 4ch | 10ch |
| ID8 | GID2 | ENABLED | 4ch | 10ch |
| ID9 | GID4 | ENABLED | — | 8ch |
| ID10 | GID5 | ENABLED | — | 10ch |
| ID11 | GID5 | ENABLED | — | 10ch |
| ID12 | GID4 | ENABLED | — | 8ch |

FIG. 22

| USER ID | TEMPORARY ID | TEMPORARY ID HISTORY |
|---|---|---|
| UID1 | ID1 | ID1 |
| UID2 | ID2 | ID2 |
| UID3 | ID3 | ID3 |
| UID4 | ID12 | ID4, ID12 |
| UID5 | ID9 | ID9 |
| UID6 | ID11 | ID5, ID11 |
| UID7 | ID6 | ID6 |
| UID8 | ID7 | ID7 |
| UID9 | ID8 | ID8 |
| UID10 | ID10 | ID10 |

FIG. 23

| USER ID | TIME t | TIME t + 1 | TIME t + 2 | TIME t + 3 |
|---|---|---|---|---|
| UID1 | 2ch | 8ch | 4ch | |
| UID2 | 2ch | 8ch | 4ch | |
| UID3 | 2ch | 8ch | 4ch | |
| UID4 | 2ch | 8ch | 4ch | |
| UID5 | – | 8ch | 4ch | |
| UID6 | 2ch | 10ch | 6ch | |
| UID7 | 4ch | 10ch | 6ch | |
| UID8 | 4ch | 10ch | 6ch | |
| UID9 | 4ch | 10ch | 6ch | |
| UID10 | – | 10ch | 6ch | |

FIG. 24

| TEMPORARY ID | GROUP ID | TRANSMISSION ENABLED/DISABLED FLAG | WATCH HISTORY | | |
|---|---|---|---|---|---|
| 401 | 402 | 403 | 404 | | |
| ID1 | GID1 | ENABLED | 2ch | 8ch | 4ch |
| ID2 | GID1 | ENABLED | 2ch | 8ch | 4ch |
| ID3 | GID1 | ENABLED | 2ch | 8ch | 4ch |
| ID4 | GID3 | ENABLED | 2ch | – | – |
| ID5 | GID3 | ENABLED | 2ch | – | – |
| ID6 | GID2 | ENABLED | 4ch | 10ch | 6ch |
| ID7 | GID2 | ENABLED | 4ch | 10ch | 6ch |
| ID8 | GID2 | ENABLED | 4ch | 10ch | 6ch |
| ID9 | GID4 | ENABLED | – | 8ch | 4ch |
| ID10 | GID5 | ENABLED | – | 10ch | 6ch |
| ID11 | GID5 | ENABLED | – | 10ch | 6ch |
| ID12 | GID4 | ENABLED | – | 8ch | 4ch |

| USER ID | TIME t | TIME t + 1 | TIME t + 2 | TIME t + 3 |
|---|---|---|---|---|
| UID1 | 2ch | 8ch | 4ch | 7ch |
| UID2 | 2ch | 8ch | 4ch | 7ch |
| UID3 | 2ch | 8ch | 4ch | 7ch |
| UID4 | 2ch | 8ch | 4ch | – |
| UID5 | – | 8ch | 4ch | 7ch |
| UID6 | 2ch | 10ch | 6ch | 8ch |
| UID7 | 4ch | 10ch | 6ch | 8ch |
| UID8 | 4ch | 10ch | 6ch | 8ch |
| UID9 | 4ch | 10ch | 6ch | 7ch |
| UID10 | – | 10ch | 6ch | 8ch |

FIG. 26

| TEMPORARY ID | GROUP ID | TRANSMISSION ENABLED/DISABLED FLAG | WATCH HISTORY | | | |
|---|---|---|---|---|---|---|
| ID1 | GID1 | ENABLED | 2ch | 8ch | 4ch | 7ch |
| ID2 | GID1 | ENABLED | 2ch | 8ch | 4ch | 7ch |
| ID3 | GID1 | ENABLED | 2ch | 8ch | 4ch | 7ch |
| ID4 | GID3 | ENABLED | 2ch | – | – | – |
| ID5 | GID3 | ENABLED | 4ch | 10ch | 6ch | 8ch |
| ID6 | GID2 | ENABLED | 4ch | 10ch | 6ch | 8ch |
| ID7 | GID2 | ENABLED | 4ch | 10ch | 6ch | 7ch |
| ID8 | GID2 | ENABLED | – | 8ch | 4ch | 7ch |
| ID9 | GID6 | ENABLED | – | 10ch | 6ch | 8ch |
| ID10 | GID4 | ENABLED | – | 10ch | 6ch | 8ch |
| ID11 | GID5 | ENABLED | – | 8ch | 4ch | – |
| ID12 | GID7 | ENABLED | | | | |

FIG. 27

| ANONYMITY | TEMPORARY ID 401 | GROUP ID 402 | WATCH HISTORY 404 | | | | | |
|---|---|---|---|---|---|---|---|---|
| ○ | ID1 | GID1 | 2ch | 8ch | 4ch | 7ch | | |
| ○ | ID2 | GID1 | 2ch | 8ch | 4ch | 7ch | | |
| ○ | ID3 | GID1 | 2ch | 8ch | 4ch | 7ch | | |
| ○ | ID4 | GID3 | 2ch | – | – | – | | |
| ○ | ID5 | GID3 | 2ch | – | – | – | | |
| ○ | ID6 | GID2 | 4ch | 10ch | 6ch | 8ch | | |
| ○ | ID7 | GID2 | 4ch | 10ch | 6ch | 8ch | | |
| × | ID8 | GID6 | 4ch | 10ch | 6ch | 7ch | | |
| × | ID9 | GID4 | – | 8ch | 4ch | 7ch | | |
| ○ | ID10 | GID5 | – | 10ch | 6ch | 8ch | | |
| ○ | ID11 | GID5 | – | 10ch | 6ch | 8ch | | |
| × | ID12 | GID7 | – | 8ch | 4ch | – | | |

| ANONYMITY | TEMPORARY ID 401 | GROUP ID 402 | WATCH HISTORY 404 | | | | | |
|---|---|---|---|---|---|---|---|---|
| ○ | ID1 | GID1 | 2ch | 8ch | 4ch | 7ch | | |
| ○ | ID2 | GID1 | 2ch | 8ch | 4ch | 7ch | | |
| ○ | ID3 | GID1 | 2ch | 8ch | 4ch | 7ch | | |
| ○ | ID4 | GID3 | 2ch | – | – | – | | |
| ○ | ID5 | GID3 | 2ch | – | – | – | | |
| ○ | ID6 | GID2 | 4ch | 10ch | 6ch | 8ch | | |
| ○ | ID7 | GID2 | 4ch | 10ch | 6ch | 8ch | | |
| × | ID8 | GID6 | 4ch | 10ch | 6ch | 7ch | | |
| ○ | ID9 | GID4 | – | 8ch | 4ch | – | | |
| ○ | ID10 | GID5 | – | 10ch | 6ch | 8ch | | |
| ○ | ID11 | GID5 | – | 10ch | 6ch | 8ch | | |
| ○ | ID12 | GID4 | – | 8ch | 4ch | – | | |
| × | ID13 | GID7 | – | – | – | 7ch | | |

FIG. 28

Table 1 (lower):

| ANONYMITY | TEMPORARY ID (401) | GROUP ID (402) | WATCH HISTORY (404) | | | |
|---|---|---|---|---|---|---|
| ○ | ID1 | GID1 | 2ch | 8ch | 4ch | 7ch |
| ○ | ID2 | GID1 | 2ch | 8ch | 4ch | 7ch |
| ○ | ID3 | GID1 | 2ch | 8ch | 4ch | 7ch |
| ○ | ID4 | GID3 | 2ch | – | – | – |
| ○ | ID5 | GID3 | 2ch | – | – | – |
| ○ | ID6 | GID2 | 4ch | 10ch | 6ch | 8ch |
| ○ | ID7 | GID2 | 4ch | 10ch | 6ch | 8ch |
| × | ID8 | GID6 | 4ch | 10ch | 6ch | 7ch |
| ○ | ID9 | GID4 | – | 8ch | 4ch | – |
| ○ | ID10 | GID5 | – | 10ch | 6ch | 8ch |
| ○ | ID11 | GID5 | – | 10ch | 6ch | 8ch |
| ○ | ID12 | GID4 | – | 8ch | 4ch | – |
| × | ID13 | GID7 | – | – | – | 7ch |

Table 2 (upper):

| ANONYMITY | TEMPORARY ID (401) | GROUP ID (402) | WATCH HISTORY (404) | | | |
|---|---|---|---|---|---|---|
| ○ | ID1 | GID1 | 2ch | 8ch | 4ch | 7ch |
| ○ | ID2 | GID1 | 2ch | 8ch | 4ch | 7ch |
| ○ | ID3 | GID1 | 2ch | 8ch | 4ch | 7ch |
| ○ | ID4 | GID3 | 2ch | – | – | – |
| ○ | ID5 | GID3 | 2ch | – | – | – |
| ○ | ID6 | GID2 | 4ch | 10ch | 6ch | 8ch |
| ○ | ID7 | GID2 | 4ch | 10ch | 6ch | 8ch |
| × | ID8 | GID6 | 4ch | 10ch | 6ch | 7ch |
| ○ | ID9 | GID4 | – | 8ch | 4ch | – |
| ○ | ID10 | GID5 | – | 10ch | 6ch | 8ch |
| ○ | ID11 | GID5 | – | 10ch | 6ch | 8ch |
| ○ | ID12 | GID4 | – | 8ch | 4ch | – |
| ○ | ID13 | GID7 | – | – | – | 7ch |
| ○ | ID14 | GID7 | – | – | – | 7ch |

FIG. 29

| ANONYMITY | TEMPORARY ID 401 | GROUP ID 402 | WATCH HISTORY 404 | | | |
|---|---|---|---|---|---|---|
| O | ID1 | GID1 | 2ch | 8ch | 4ch | 7ch |
| O | ID2 | GID1 | 2ch | 8ch | 4ch | 7ch |
| O | ID3 | GID1 | 2ch | 8ch | 4ch | 7ch |
| O | ID4 | GID3 | 2ch | – | – | – |
| O | ID5 | GID3 | 2ch | – | – | – |
| O | ID6 | GID2 | 4ch | 10ch | 6ch | – |
| O | ID7 | GID2 | 4ch | 10ch | 6ch | – |
| x | ID8 | GID6 | 4ch | 10ch | 6ch | – |
| O | ID9 | GID4 | – | 8ch | 4ch | – |
| O | ID10 | GID5 | – | 10ch | 6ch | 8ch |
| O | ID11 | GID5 | – | 10ch | 6ch | 8ch |
| O | ID12 | GID4 | – | 8ch | 4ch | – |
| O | ID13 | GID7 | – | – | – | 7ch |
| O | ID14 | GID7 | – | – | – | 7ch |

| ANONYMITY | TEMPORARY ID 401 | GROUP ID 402 | WATCH HISTORY 404 | | | |
|---|---|---|---|---|---|---|
| O | ID1 | GID1 | 2ch | 8ch | 4ch | 7ch |
| O | ID2 | GID1 | 2ch | 8ch | 4ch | 7ch |
| O | ID3 | GID1 | 2ch | 8ch | 4ch | 7ch |
| O | ID4 | GID3 | 2ch | – | – | – |
| O | ID5 | GID3 | 2ch | – | – | – |
| O | ID6 | GID2 | 4ch | 10ch | 6ch | – |
| O | ID7 | GID2 | 4ch | 10ch | 6ch | – |
| O | ID8 | GID2 | 4ch | 10ch | 6ch | – |
| O | ID9 | GID4 | – | 8ch | 4ch | – |
| O | ID10 | GID5 | – | 10ch | 6ch | 8ch |
| O | ID11 | GID5 | – | 10ch | 6ch | 8ch |
| O | ID12 | GID4 | – | 8ch | 4ch | – |
| O | ID13 | GID7 | – | – | – | 7ch |
| O | ID14 | GID7 | – | – | – | 7ch |
| O | ID15 | GID6 | – | – | – | 8ch |
| O | ID16 | GID6 | – | – | – | 8ch |

FIG. 30

| TEMPORARY ID | GROUP ID | TRANSMISSION ENABLED/DISABLED FLAG | WATCH HISTORY | | |
|---|---|---|---|---|---|
| ID1 | GID1 | ENABLED | 2ch | 8ch | 4ch | 7ch |
| ID2 | GID1 | ENABLED | 2ch | 8ch | 4ch | 7ch |
| ID3 | GID1 | ENABLED | 2ch | 8ch | 4ch | 7ch |
| ID4 | GID3 | ENABLED | 2ch | – | – | – |
| ID5 | GID3 | ENABLED | 2ch | – | – | – |
| ID6 | GID2 | ENABLED | 4ch | 10ch | 6ch | – |
| ID7 | GID2 | ENABLED | 4ch | 10ch | 6ch | – |
| ID8 | GID2 | ENABLED | 4ch | 10ch | 6ch | – |
| ID9 | GID4 | ENABLED | – | 8ch | 4ch | – |
| ID10 | GID5 | ENABLED | – | 10ch | 6ch | 8ch |
| ID11 | GID5 | ENABLED | – | 10ch | 6ch | 8ch |
| ID12 | GID4 | ENABLED | – | 8ch | 4ch | – |
| ID13 | GID7 | ENABLED | – | – | – | 7ch |
| ID14 | GID7 | ENABLED | – | – | – | 7ch |
| ID15 | GID6 | ENABLED | – | – | – | 8ch |
| ID16 | GID6 | ENABLED | – | – | – | 8ch |

FIG. 31

| USER ID | TEMPORARY ID | TEMPORARY ID HISTORY |
|---|---|---|
| UID1 | ID1 | ID1 |
| UID2 | ID2 | ID2 |
| UID3 | ID3 | ID3 |
| UID4 | ID12 | ID4, ID12 |
| UID5 | ID13 | ID9, ID13 |
| UID6 | ID11 | ID5, ID11 |
| UID7 | ID15 | ID6, ID15 |
| UID8 | ID16 | ID7, ID16 |
| UID9 | ID14 | ID8, ID14 |
| UID10 | ID10 | ID10 |

FIG. 33

| TEMPORARY ID | GROUP ID | TRANSMISSION ENABLED/DISABLED FLAG | WATCH HISTORY | | | |
|---|---|---|---|---|---|---|
| ID1 | GID1 | ENABLED | 2ch | 8ch | 4ch | 7ch |
| ID2 | GID1 | ENABLED | 2ch | 8ch | 4ch | 7ch |
| ID3 | GID1 | ENABLED | 2ch | 8ch | 4ch | 7ch |
| ID4 | GID3 | ENABLED | 2ch | – | – | – |
| ID5 | GID3 | ENABLED | 2ch | – | – | – |
| ID6 | GID2 | ENABLED | 4ch | SPECIAL | 6ch | – |
| ID7 | GID2 | ENABLED | 4ch | SPECIAL | 6ch | – |
| ... | ... | ... | ... | ... | ... | ... |

HISTORY INFORMATION ANONYMIZATION METHOD AND HISTORY INFORMATION ANONYMIZATION DEVICE FOR ANONYMIZING HISTORY INFORMATION

BACKGROUND

1. Technical Field

The present disclosure relates to a history information anonymization method and a history information anonymization device for anonymizing history information.

2. Description of the Related Art

In recent years, the number of network-connectable household electrical appliances or AV equipment for domestic use has been growing. Along with the growth, the possibility that cloud providers collect various types of history information, including operation history of household electrical appliances or AV equipment, through a network is under study. It is now expected that the collected history information is analyzed to provide services suited for individuals and is utilized in new product development and a marketing strategy.

When history information is provided to a third party, the information should be anonymized so that an owner of the data cannot be identified. Anonymization methods generally include a k-anonymity technique that processes data to prevent the narrowing of the number of persons to less than k, by, for example, deleting a characteristic attribute. The k-anonymity is described in International Publication No. WO 11/142327 and "k-Anonymity: A Model for Protecting Privacy", International Journal of Uncertainty, Fuzziness and Knowledge-Based Systems, 2002.

SUMMARY

In such anonymization of history information, it is not preferable that part of the information is lost due to anonymization processing.

One non-limiting and exemplary embodiment provides a history information anonymization method or a history information anonymization device that can prevent loss of information due to the anonymization processing.

In one general aspect, the techniques disclosed here feature a history information anonymization method for anonymizing a plurality of pieces of history information periodically collected from a plurality of user devices, including an association step of associating each of a plurality of pieces of history information collected from the plurality of user devices in a current cycle with an ID associated with a user device at a collection destination; a grouping step of getting together, on a group basis, a plurality of IDs for which contents of history information associated in the current cycle and in a past cycle are identical; an anonymity judgment step of judging whether each of the plurality of groups satisfies anonymity; and an ID changing step of changing only some of a plurality of IDs associated with the plurality of user devices when it is judged that any of the plurality of groups does not satisfy anonymity, and changing an association destination of history information collected in the current cycle from the user devices with changed IDs from an ID of the user device before being changed to an ID after being changed.

The present disclosure can provide a history information anonymization method or a history information anonymization device that can prevent loss of information due to anonymization processing.

It should be noted that general or specific embodiments may be implemented as a system, a method, an integrated circuit, a computer program, a storage medium, or any selective combination thereof.

Note that these general and specific aspects may be implemented in a system, a method, an integrated circuit, a computer program, or a recording medium such as a computer readable CD-ROM or the like, and may be implemented by any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a block diagram of a collection server in the embodiment;

FIG. 5 is a view showing an example of a user management table in the embodiment;

FIG. 6 is a view showing an example of a correspondence table of a user ID and a temporary ID in the embodiment;

FIG. 14 is a view showing an example of watch history at time t in an embodiment;

FIG. 16 is a view showing an example of the user management table at time t in the embodiment;

FIG. 17 is a view showing an example of the watch history at time t+1 in the embodiment;

FIG. 18 is a view showing an example of the user management table at time t+1 in the embodiment;

FIG. 21 is an example of the user management table after being updated at time t+1 in the embodiment;

FIG. 22 is a view showing an example of the ID correspondence table at time t+1 in the embodiment;

FIG. 23 is a view showing an example of the watch history at time t+2 in the embodiment;

FIG. 24 is a view showing an example of the user management table at time t+2 in the embodiment;

FIG. 25 is a view showing an example of the watch history at time t+3 in the embodiment;

FIG. 26 is a view showing an example of the user management table at time t+3 in the embodiment;

FIG. 27 is a view illustrating anonymization processing at time t+3 in the embodiment;

FIG. 28 is a view illustrating the anonymization processing at time t+3 in the embodiment;

FIG. 29 is a view illustrating the anonymization processing at time t+3 in the embodiment;

FIG. 30 is a view showing an example of the user management table after being updated at time t+3 in the embodiment;

FIG. 31 is a view showing an example of the ID correspondence table at time t+3 in the embodiment;

FIG. 33 is a view showing an example of a user management table in the variation.

Figure 1:
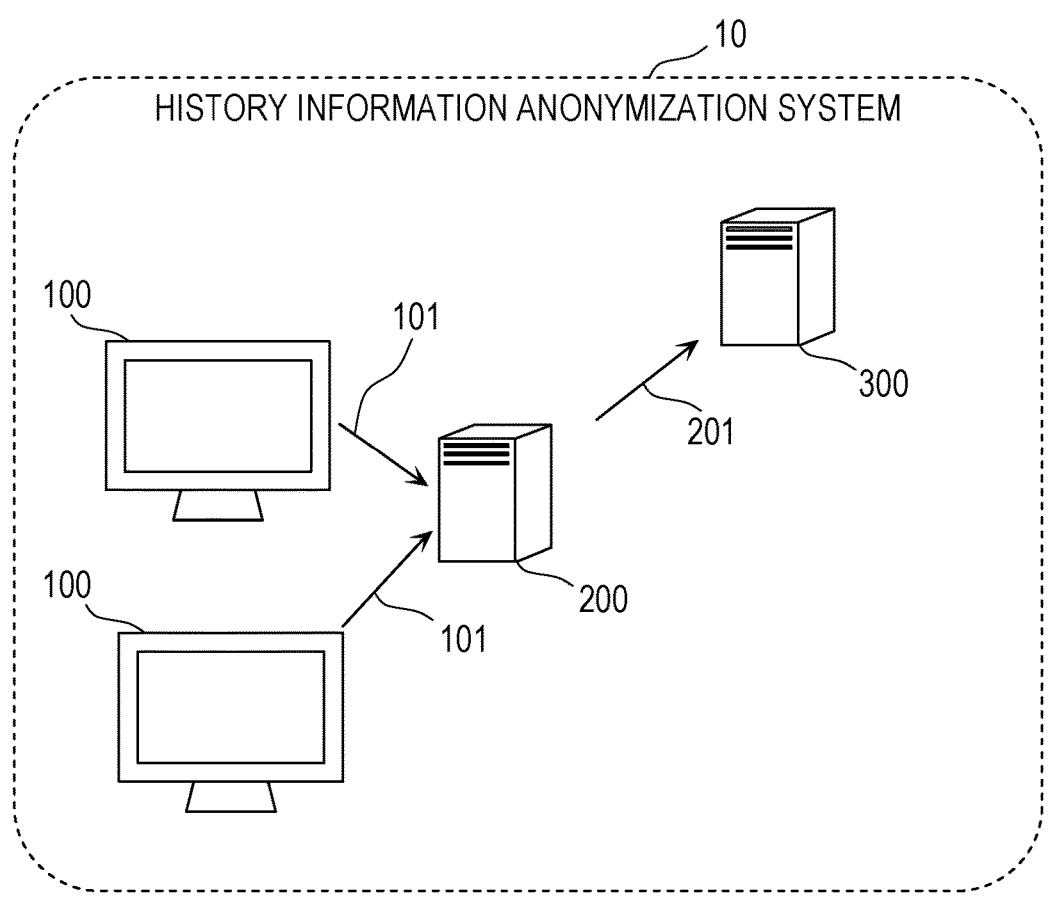
FIG. 1 is a view showing an overall configuration of a history information anonymization system in an embodiment.

DETAILED DESCRIPTION (Underlying Knowledge Forming Basis of the Present Disclosure)

The conventional k-anonymity method is a method applicable to information that is still meaningful when part of the information such as a telephone number, a birth date, or position information is concealed. The method is not applicable to information, part of which cannot be concealed, such as which television channel is watched.

On the one hand, as a method of preventing identification of individuals by such history information, a method is conceived of replacing a temporary ID in a predetermined period such as every month.

However, if a temporary ID is replaced every month, for example, there is a problem that data cannot be analyzed beyond that period, and cannot be compared and analyzed with information from one year before, for example.

Hence, the present disclosure provides a method of creating a state in which individuals cannot be identified by not changing a temporary ID of a user who satisfies k-anonymity but changing only a temporary ID of a user who does not satisfy k-anonymity, and extending a period of replacement of a temporary ID.

A history information anonymization method for anonymizing a plurality of pieces of history information periodically collected from a plurality of user devices, including an association step of associating each of the plurality of pieces of history information collected from the plurality of user devices in a current cycle with an ID associated with a user device at a collection destination; a grouping step of getting together a plurality of IDs into a plurality of groups such that for the IDs in each group, contents of history information associated in the current cycle and in a past cycle are identical; an anonymity judgment step of judging whether each of the plurality of groups satisfies anonymity; and an ID changing step of changing only part of a plurality of IDs associated with the plurality of user devices when it is judged that any of the plurality of groups does not satisfy anonymity, and changing an association destination of history information collected in the current cycle from user devices with changed IDs from an ID of the user device before being changed to an ID after being changed.

With this, if anonymity of a group is not satisfied, only part of the IDs in the groups is changed. Accordingly, loss of information due to anonymization processing can be prevented since an ID replacement period can be extended, while creating a state in which an individual cannot be identified.

For example, in the ID changing step, IDs included in a group that is judged not to satisfy anonymity may be changed as the part of the IDs mentioned above.

For example, the ID changing step may include a selection step of selecting an ID included in a second group different from a first group judged not to satisfy anonymity, such that changing the selected ID causes the first group to satisfy anonymity. In the ID changing, the selected ID is changed as the part of the IDs mentioned above.

With this, for example, even when changing an ID of a group that does not satisfy anonymity cannot satisfy anonymity of the group, anonymity of the group can be satisfied by changing an ID of another group.

For example, in the selection step, an ID included in the second group may be selected such that anonymity of the second group is maintained.

This can prevent anonymity of another group from not being satisfied by changing an ID in the second group. This can implement anonymization processing appropriately and at high speed.

For example, in the selection step, when history information of the first group in the current cycle indicates that the user device is not used, the second group whose history information in the past cycle excluding the history information in the current cycle is the same as that of the first group may be selected to select an ID included in the second group.

For example, in the selection step, if anonymity of the second group cannot be maintained when part of IDs included in the second group is changed, all IDs included in the second group may be selected.

This can prevent anonymity of another group from not being satisfied, by changing an ID in the second group. This can implement anonymity processing appropriately and at high speed.

For example, in the selection step, when past history information of the first group excluding history information in the current cycle indicates that the user device is not used, the second group whose history information in the current cycle is the same as that of the first group may be selected to select an ID included in the second group.

For example, in the selection step, if anonymity of the second group cannot be maintained when part of the IDs included in the second group is changed, all IDs included in the second group may be selected.

Changing an ID can prevent anonymity of another group from not being satisfied. This can implement anonymity processing appropriately and at high speed.

For example, the history information may be watch history of television.

For example, when an interval of changing the watch history is shorter than a threshold, the history information anonymization method may further change the watch history to history information indicating that a special channel is watched.

Since this can reduce frequency of changing an ID, loss of information due to anonymization processing can be prevented.

For example, in the anonymity judgment step, when the number of IDs included in a group is equal to or more than predetermined k (an integer equal to or more than 2), it may be judged that the group satisfies anonymity, and when the number of IDs included in the group is less than k, it may be judged that the group does not satisfy anonymity.

In addition, a history information anonymization device according to one aspect of the present disclosure is a history anonymization device for anonymizing a plurality of pieces of history information periodically collected from a plurality of user devices, including: a processor; and a non-transitory memory having stored therein instructions which, when executed by the processor, cause the processor to perform operations comprising: associating each of the plurality of pieces of history information collected from the plurality of user devices in a current cycle with an ID associated with a user device at a collection destination; getting together a plurality of IDs into a plurality of groups such that for the IDs in each group, contents of history information associated in the current cycle and in a past cycle are identical; judging whether each of the plurality of groups satisfies anonymity; and changing only part of a plurality of IDs associated with the plurality of user devices when it is judged that any of the plurality of groups does not satisfy anonymity, and changing an association destination of history information collected in the current cycle from user devices with changed IDs from an ID of the user device before being changed to an ID after being changed.

With this, if anonymity of a group is not satisfied, only part of its IDs are changed. Accordingly, loss of information due to anonymization processing can be prevented since an ID replacement period can be extended, while creating a state in which an individual cannot be identified.

Note that these comprehensive or specific aspects may be implemented in a system, a method, an integrated circuit, a computer program, or a recording medium such as a computer readable CD-ROM or the like, and may be implemented by any combination thereof.

A history information anonymization system according to an embodiment of the present disclosure is described hereinafter with reference to the drawings. Note that any of the embodiments to be described below represents a preferred specific example of the present disclosure. More specifically, a numeric value, shape, a material, a component, arrangement and connection forms of components, a step, order of steps or the like to be shown in the following embodiments are an example of the present disclosure and not intended to limit the present disclosure. The present disclosure is identified based on descriptions in the claims. Therefore, of components in the following embodiments, a component which is not described in an independent claim that represents a concept of the highest order of the present disclosure is not necessarily needed to solve the problem of the present disclosure, but described as a component that constitutes a more preferred form.

EMBODIMENTS

1. System Configuration

Here, as an embodiment of the present disclosure, a history information anonymization system 10 according to the present disclosure is described with reference to the drawings.

[1.1 Overall Configuration of the History Information Anonymization System 10]

FIG. 1 is a view showing an overall configuration of the history information anonymization system 10 according to the embodiment. The history information anonymization system 10 includes a plurality of TVs 100, a collection server 200, and an analysis server 300.

Each TV 100 records history information 101 which is information on what channel and at what time a user watched. The TV 100 transmits the history information 101 to the collection server 200, when the user changes channels, when the collection server 200 makes a transmission request, or on a regular basis. Note that in the following, while an example in which the history information 101 is a TV watch history is described, the history information 101 may be other types of history information, such as TV operation history, for example.

Figures 2, 3:
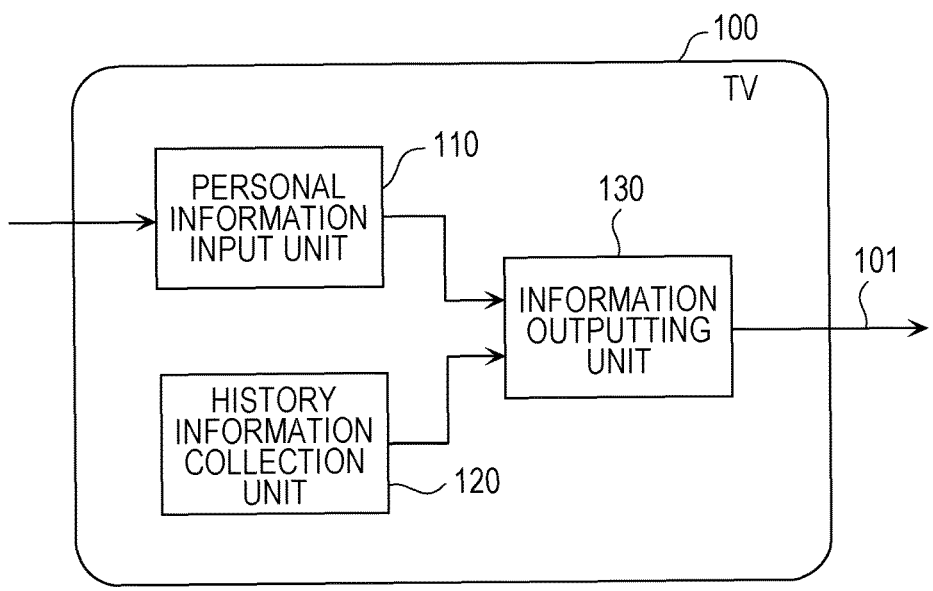
FIG. 2 is a view showing an example of a watch history in the embodiment.
FIG. 3 is a block diagram of a TV in the embodiment.

The collection server 200 collects the history information 101 from the plurality of TVs 100 and records the collected history information 101. FIG. 2 is a view showing an example of a data format of a watch history (history information 101). In this example, the watch history shows, for each user, a channel that the user watched at each time. In addition, when the user does not watch TV, "-" is shown.

In addition, the collection server 200 transmits history information 201, in response to a request of the analysis server 300. Specifically, the collection server 200 generates history information 201 by anonymizing the history information 101, and transmits the generated history information 201 to the analysis server 300. Note that a detailed method for the anonymization is described later.

The analysis server 300 acquires the history information 201 from the collection server 200 and analyzes the acquired history information 201. For example, based on an analysis result, a service provider provides services suited for individuals, develops a new product, or formulates a marketing strategy.

Note that while in this embodiment, an example is described in which a user device for transmitting the history information is the TV 100. However the embodiment is not limited to this and the user device may be a media player, a recorder, or a set top box or the like.

[1.2 Configuration of the TV 100]

FIG. 3 is a view showing a configuration of the TV 100 according to the embodiment. The TV 100 includes a personal information input unit 110, a history information collection unit 120, and an information outputting unit 130.

The personal information input unit 110 is an input unit for a user of the TV 100 to enter his/her own personal information. The personal information entered is transmitted to the collection server 200 via the information outputting unit 130.

The history information collection unit 120 collects history information 101 such as watch history or an operation record. The collected history information 101 is transmitted to the collection server 200 via the information outputting unit 130. In addition, part or all of the history information 101 is recorded in a history information holding unit (not shown) within the TV 100.

The information outputting unit 130 transmits to the collection server 200 the personal information and the history information 101 acquired from the personal information input unit 110 or the history information collection unit 120. When transmitting the personal information or the history information 101 to the collection server 200, the information outputting unit 130 adds a user ID, which is associated with the personal information, to the personal information or the history information 101 and then transmits it to the collection server 200.

[1.3 Configuration of the Collection Server 200]

FIG. 4 is a view showing a configuration of the collection server 200 according to the embodiment. The collection server 200 includes an information input unit 210, a personal information manager 220, a history information manager 230, a data holding unit 240, an anonymization processor 250, and an information transmitter 260.

The information input unit 210 is an input unit for acquiring personal information and the history information 101 from the TV 100. Of the acquired information, the information input unit 210 transmits the personal information to the personal information manager 220 and the history information 101 to the history information manager 230.

The personal information manager 220 records the personal information received from the TV 100 in the data holding unit 240. The personal information manager 220 also performs management of personal information, such as transmission of personal information to other device, in response to a request from the other devices.

The history information manager 230 records the history information 101 received from the TV 100 in the data holding unit 240. The history information manager 230 also requests the anonymization processor 250 to perform anonymization processing when the analysis server 300 requests the history information.

The data holding unit 240 holds personal information and the history information 101, or the like. FIG. 5 is a view showing an example of a user management table 400 which is to manage the history information 101 of a user and which is held in the data holding unit 240. Here, a case is shown in which the history information 101 is a watch history.

The user management table 400 shows a plurality of temporary IDs 401, a group ID 402 associated with each of the temporary IDs 401, a transmission enabled/disabled flag 403, and watch history 404 (history information). The temporary ID 401 is an identifier assigned to each user, and one or more temporary IDs 401 is associated with a user. The temporary ID 401 is changed every time watch history 404 does not satisfy k-anonymity.

The group ID 402 is an ID for identifying a group in which temporary IDs 401 having the same watch history 404 are get together. The transmission enabled/disabled flag 403 is a flag indicating whether or not history information may be transmitted to the analysis server 300 or the like. For example, when "enabled" is marked, it indicates that history information may be transmitted, and when "disabled" is marked, it indicates that history information must not be transmitted. The watch history 404 (history information) is information that is added as time elapses, such as watch history of the TV 100.

FIG. 6 is a view showing an example of an ID correspondence table 410 which shows a correspondence relation between a user ID and a temporary ID. The ID correspondence table 410 shows a plurality of user IDs 411, temporary IDs 412 associated with the respective user IDs 411, and temporary ID history 413. The user ID 411 is an ID for identifying a user device (TV 100). The temporary ID 412 represents the temporary ID 412 currently associated with the user ID 411. The temporary ID history 413 shows a history of temporary IDs associated with the user ID 411 at present and in the past.

When newly receiving history information 101 from the TV 100, the history information manager 230 refers to the ID correspondence table 410 and distinguishes a temporary ID 412 that is associated with a user ID assigned to the history information 101. Then, the history information manager 230 associates the received history information 101 with the distinguished temporary ID 412 and adds the received history information 101 to a watch history 404 of the user management table 400.

The anonymization processor 250 performs anonymization processing when the analysis server 300 makes a request for history information. Specifically, the anonymization processor 250 generates history information 201 by processing the watch history 404 to a state in which k-anonymity is satisfied. A detailed configuration is described later.

The information transmitter 260 transmits the anonymized history information 201 to the analysis server 300 when the analysis server 300 makes a request for history information.

[1.4 Configuration of the Analysis Server 300]

Figure 7:
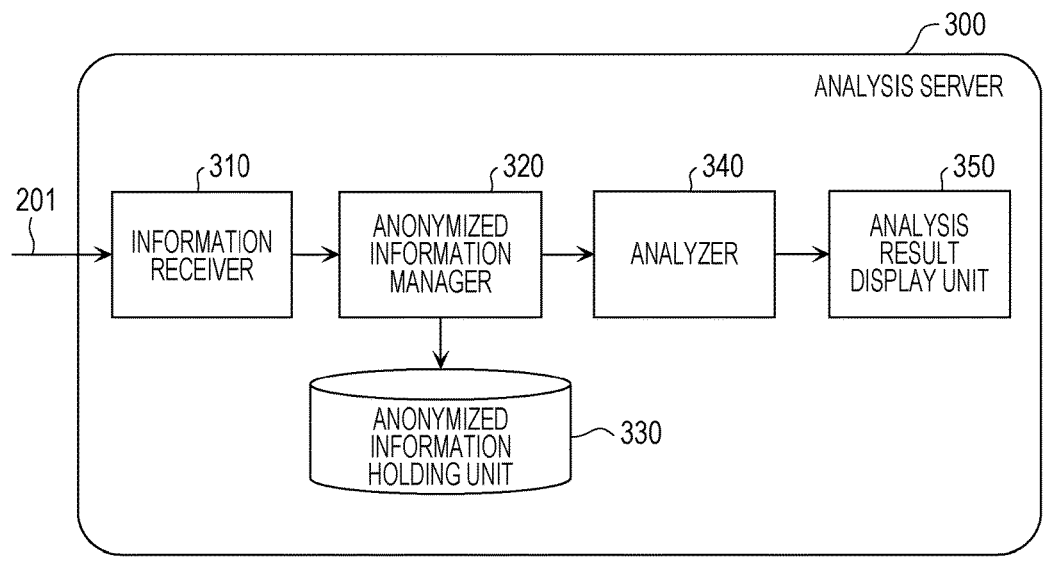
FIG. 7 is a block diagram of an analysis server in the embodiment.

FIG. 7 is a view showing a configuration of the analysis server 300 according to the embodiment. The analysis server 300 includes an information receiver 310, an anonymized information manager 320, an anonymized information holding unit 330, an analyzer 340, and an analysis result display unit 350.

The information receiver 310 receives anonymized history information 210 from the collection server 200.

The anonymized information manager 320 manages the history information 210 received from the collection server 200.

The anonymized information holding unit 330 holds the history information 201 received from the collection server 200.

The analyzer 340 analyzes the history information 201 and generates analysis data necessary for provision of services suited for individuals, development of new products, formulation of a marketing strategy, or the like.

The analysis result display unit 350 displays analysis data, which is a result analyzed by the analyzer 340, and presents the analysis result to a service provider.

[1.5 Configuration of the Anonymization Processor 250]

Figure 8:
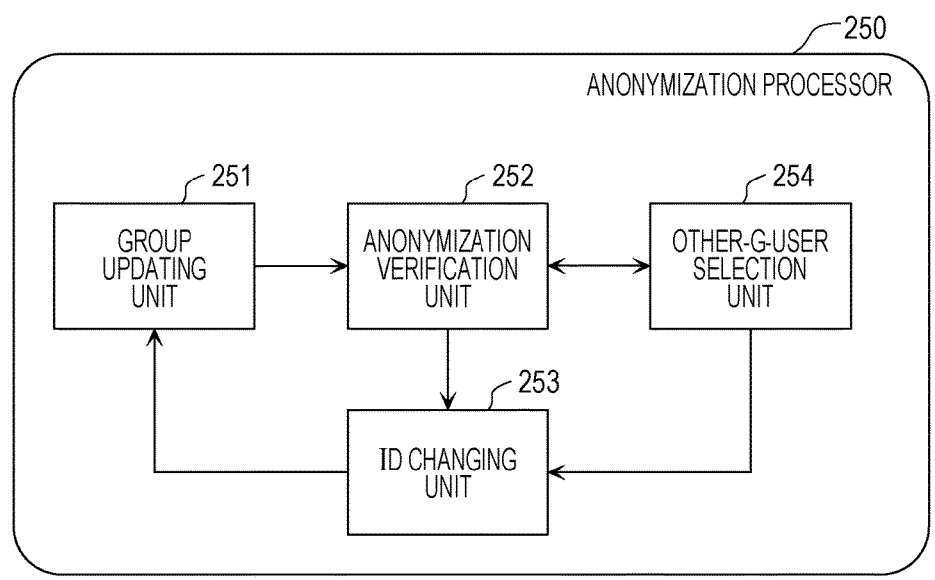
FIG. 8 is a block diagram of an anonymization processor in the embodiment.

FIG. 8 is a view showing a configuration of the anonymization processor 250 according to the embodiment. The anonymization processor 250 includes a group updating unit 251, an anonymization verification unit 252, an ID changing unit 253, and an other-group-user selection unit (other-G-user selection unit) 254.

The group updating unit 251 updates a group ID 402 of the user management table 400 so that user temporary IDs 401 having the same history information (watch history 404) can belong to the same group. For example, the group updating unit 251 sets users in the same group who have a history of having watched the same program (channel) in the past. When the watch history 404 is updated as new history information 101 is received and a new history is added, the group updating unit 251 generates a new group according to a type of the added history and assigns a group ID 402 to the newly generated group.

For example, some of the plurality of users who are set as the same group change TV channels, and thus are divided into users who watch 2ch, those who watch 4ch, and those who no longer watch TV. In this case, the group updating unit 251 newly adds two group IDs 402, and assigns to the users watching 2ch one of the newly added group IDs 402 and to the users watching 4ch the remaining of the newly added group ID 402. In addition, the group updating unit 251 does not change the group ID 402 of the users who no longer watch TV. This enables the group updating unit 251 to set different group IDs 402 according to the three types of history information: 2ch, 4ch, and no longer watching TV.

The anonymization verification unit 252 verifies whether history information satisfies k-anonymity. Specifically, the anonymization verification unit 252 counts how many users are set in the same group, for each group set by the group updating unit 251. Then, the anonymization verification unit 252 checks whether each group has k or more users (k is an integer equal to or more than 2). When all groups have k or more users, the anonymization verification unit 252 judges that the history information satisfies k-anonymity. When there is any group having less than k users, the anonymization verification unit 252 judges that the history information does not satisfy k-anonymity.

The anonymization verification unit 252 also judges k-anonymity of each group. Specifically, if the number of users set in a group targeted for judgment is equal to or more than k, the anonymization verification group 252 judges that the group satisfies k-anonymity. If not, the anonymization verification unit 252 judges that the group does not satisfy k-anonymity.

In addition, if a group is present which does not satisfy k-anonymity and the group is a group of users who continue to watch TV, the anonymization verification unit 252 instructs the ID changing unit 253 to change temporary IDs of the users included in the group. In addition, if a group is present which does not satisfy k-anonymity and the group is a group other than the group of users who continue to watch TV, the anonymization verification group 252 instructs the other-group-user selection unit 254 to select a user in another group. Now, the group other than the group of users who continue to watch TV is a group of users who have finished watching TV 100 and a group of users who have newly started to watch TV 100.

The ID changing unit 253 changes requested temporary IDs of the users. Specifically, the ID changing unit 253 adds a new temporary ID 401 to the user management table 400, updates to the new temporary ID an original temporary ID written in the temporary ID 412 of the ID correspondence table 410, and adds the new temporary ID to the temporary ID history 413.

The other-group-user selection unit 254 selects enough users to satisfy k-anonymity from other related groups, when the group of users who have finished watching TV 100 or the group of users who have newly started to watch TV 100 does not satisfy k-anonymity.

Specifically, when the group of users who have finished watching TV 100 does not satisfy k-anonymity, the other-group-user selection unit 254 selects another group of users having the same history information other than the latest history information, and selects from the group enough users for the targeted group not satisfying k-anonymity to satisfy k-anonymity. In addition, when the group of users who have newly started to watch TV 100 does not satisfy k-anonymity, the other-group-user selection unit 254 selects another group of users having the same latest history information, and selects from the group enough users for the targeted group not satisfying k-anonymity to satisfy k-anonymity. Furthermore, the other-group-user selection unit 254 requests the anonymization verification unit 252 to verify whether or not the group selected above satisfies k-anonymity, when the users selected above are removed from the group selected above. If, as a result of the verification, the group does not satisfy k-anonymity, the other-group-user selection unit 254 selects all users of the group. The other-group-user selection unit 254 requests the ID changing unit 253 to change the temporary IDs of the users selected above.

2 Operation

Operation of the history information anonymization system 10 is described hereinafter.

[2.1 Overall Operation]

Figure 9:
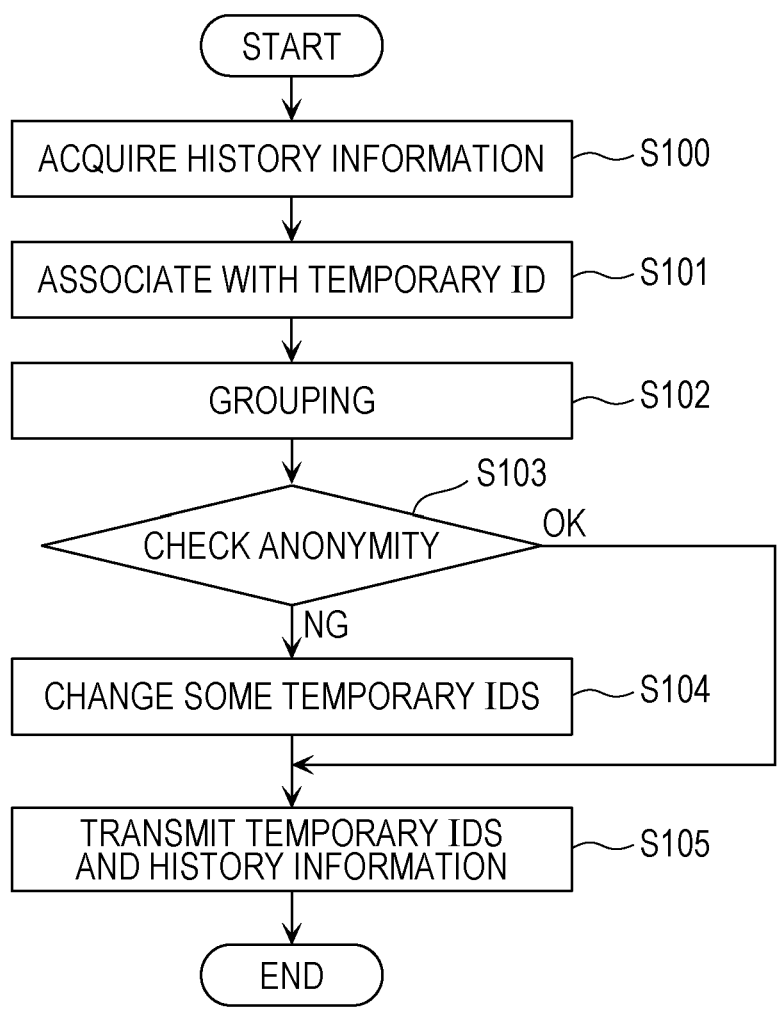
FIG. 9 is a flow chart of the collection server in the embodiment.

FIG. 9 is a flow chart showing overall operation of the collection server 200. The collection server 200 generates history information 201 by anonymizing a plurality of pieces of history information 101 periodically collected from a plurality of TVs 100 (user devices). The term periodically used herein may be a certain cycle or a variable cycle. For example, the collection server 200 may collect the history information 101 in a predetermined cycle or may collect the history information 101 at timing when the history information 101 is generated by the TV 100 or at arbitrary timing. In addition, the processing shown in FIG. 9 is performed every time the history information 101 is collected.

First, the collection server 200 acquires the history information 101 from the plurality of TVs 100 in a current cycle (S100).

Then, the collection server 200 associates each of the plurality of pieces of history information 101 collected from the plurality of TVs 100 in the current cycle with a temporary ID associated with a TV 100 at a collection destination (S101). Specifically, the history information 101 is assigned with a user ID of a TV 100 at a transmission source of the history information 101. The collection server 200 refers to an ID correspondence table 410 and identifies a temporary ID 412 corresponding to the user ID. Then, the collection server 200 associates the history information 101 obtained in the current cycle with the identified temporary ID 412 (401) and adds it to a watch history 404 in a user management table 400, thereby updating the watch history 404.

Then, the collection server 200 gets together, on a group basis, a plurality of temporary IDs 401 for which contents of the history information 101 (watch history 404) associated in the current cycle and in a past cycle are identical. That is to say, the collection server 200 updates a group ID 402 so that the temporary IDs 401 having the same watch history 404 can belong to the same group (S102).

Then, the collection server 200 checks whether the history information 101 satisfies k-anonymity. That is to say, the collection server 200 judges whether each of the plurality of groups satisfies anonymity (S103). Specifically, the collection server 200 judges whether each group includes the temporary IDs 401 the number of which is equal to or more than k. When the number of the temporary IDs 401 included in a group is equal to or more than a predetermined k (an integer equal to or more than 2), the collection server 200 judges that the group satisfies anonymity. When the number of the temporary IDs 401 included in the group is less than k, the collection server 200 judges that the group does not satisfy anonymity.

If it is judged that any of the plurality of groups does not satisfy anonymity, that is to say, when the watch history 404 after being updated does not satisfy anonymity (NG in S103), the collection server 200 updates only some of the plurality of temporary IDs 401 associated with the plurality of TVs 100 (S104). In addition, the collection server 200 changes an association destination of the history information 101 (watch history 404) collected in the current cycle from the TV 100 whose temporary ID 401 is changed, from an unchanged temporary ID 401 of the TV 100 to a changed temporary ID 401.

Then, the collection server 200 transmits to the analysis server 300 the history information 201 that includes the history information 101 in the current cycle and the temporary ID after being changed (S105).

On the one hand, if it is judged that all of the plurality of groups satisfy anonymity, that is to say, when the watch history 404 after being updated satisfies k-anonymity (OK in S103), the collection server 200 transmits to the analysis server 300 the history information 201 that includes the history information 101 in the current cycle and a current temporary ID (S105).

Note that here, while the collection server 200 performs processing every time it receives history information 101 at a certain point in time, it may perform processing every time it receives history information 101 at a plurality of points in time. In addition, while the collection server 200 transmits history information 201 to the analysis server 300 every time it receives the history information 101 at a certain point in time, it may collectively transmit the history information 201 at a plurality of points in time to the analysis server 300.

[2.2 Overview of Anonymization Processing]

Processing to anonymize collected history information (S102 to S104 in FIG. 9) is described hereinafter with reference to FIG. 10.

First, the anonymization processor 250 of the collection server 200 updates a group ID 402 associated with a temporary ID 401 to which a watch history 404 is newly added since the last anonymization processing (S110). Specifically, the anonymization processor 250 updates the group ID 402 so that the temporary IDs having the same watch history 404 can belong to a same group. For example, for a family of temporary IDs to which the same group ID 402 is originally assigned, the anonymization processor 250 divides a plurality of temporary IDs 401 included in the family of temporary IDs into a plurality of groups so that temporary IDs having the same newly added watch history 404 can belong to the same group, and assigns a different group ID 402 to each of the divided groups.

Then, for each group ID 402 after being updated, the anonymization processor 250 checks whether or not the group satisfies k-anonymity (S111). If all groups satisfy k-anonymity (OK in S111), the anonymization processor 250 finishes the processing (S112).

On the one hand, when one or more groups do not satisfy k-anonymity (NG in S111), the anonymization processor 250 extracts the groups not satisfying k-anonymity and performs subsequent processing on each group.

First, the anonymization processor 250 judges a type of a group (S113). Specifically, when the anonymization processor 250 continuously receives history information 101, that is to say, when a user continues to watch TV 100, it judges "Continued". In addition, when the anonymization processor 250 stops receiving the history information 101, or when the anonymization processor 250 receives information indicating that the TV 100 has been turned off, that is to say, when the user has finished watching TV 100, the anonymization processor 250 judges "Ended". In addition, when the anonymization processor 250 receives history information 101 from a new TV 100, or when the anonymization processor 250 receives information indicating that the TV 100 has been turned on, that is to say, when the user has started to watch TV 100, the anonymization processor 250 judges "New".

When the anonymization processor 250 judges "Continued" ("Continued" in S113), the anonymization processor 250 changes the temporary ID assigned to the TV 100 of the group that does not satisfy anonymity (S114). That is to say, when the latest history information of the group that does not satisfy anonymity and history information in the current cycle both indicate that the TV is being used, the anonymization processor 250 changes the temporary ID included in the group that is judged not to satisfy anonymity. Specifically, the anonymization processor 250 generates a new temporary ID, records the latest history information of the original temporary ID as history information of the new temporary ID, and deletes the latest history information of the original temporary ID. The anonymization processor 250 also changes the temporary ID 412 in the ID correspondence table 410 to the new temporary ID and adds the new temporary ID to the temporary ID history 413.

When the anonymization processor 250 judges "ended" ("ended" in S113), the anonymization processor 250 selects some of the users included in a different group that is the same as the group before being updated which does not satisfy anonymity (S115). That is to say, when history information of a first group in a current cycle which does not satisfy anonymity indicates that TV is not used, the anonymization processor 250 selects an ID which is a temporary ID included in a second group different from a first group and which causes the first group to satisfy anonymity by changing the ID. Specifically, for example, the anonymization processor 250 selects a second group for which history information in a past cycle excluding history information in a current cycle is the same as a first group.

Then, the anonymization processor 250 checks k-anonymity of the different group when selected users are excluded from the different group (S117). When the anonymization processor 250 judges that the different group does not satisfy k-anonymity ("NG" in S117), the anonymization processor 250 selects all users in the different group (S118). That is to say, if anonymity of the second group cannot be maintained when some of the temporary IDs included in the second group are changed, the anonymization processor 250 selects all temporary IDs included in the second group.

Then, the anonymization processor 250 changes the temporary IDs of the selected users (all users in a group) (S119). Note that a method for changing the temporary ID is the same as step S114.

On the one hand, when the anonymization processor 250 judges that the different group satisfies k-anonymity ("OK" in S117), the anonymization processor 250 changes the temporary IDs of some users (S119) in the different group selected in step S115.

As such, the anonymization processor 250 selects a temporary ID included in the second group so that anonymity of the second group different from the first group judged not to satisfy anonymity can be maintained.

In addition, when the anonymization processor 250 judges "New" in step S113, the anonymization processor 250 selects some of the users included in another group who are watching the same channel as a group that does not satisfy anonymity in the latest history information (S116). That is to say, when past history information excluding history information on the first group in a current cycle that does not satisfy anonymity indicates that TV is not used, the anonymization processor 250 selects a temporary ID that is a temporary ID that is included in the second group different from the first group and that causes the first group to satisfy anonymity by changing the temporary ID. Specifically, for example, the anonymization processor 250 selects a second group for which history information in a current cycle is the same as a first group and selects a temporary ID included in the second group.

Then, similarly to the case of "Ended" in step S113 mentioned above, the anonymization processor 250 performs the processing from step S117 to step S119.

After the processing described above ends, the processing returns to step S110. That is to say, the processing is repeated until k-anonymity of all groups is satisfied.

[2.3 Details of Anonymization Processing]

Figure 10:
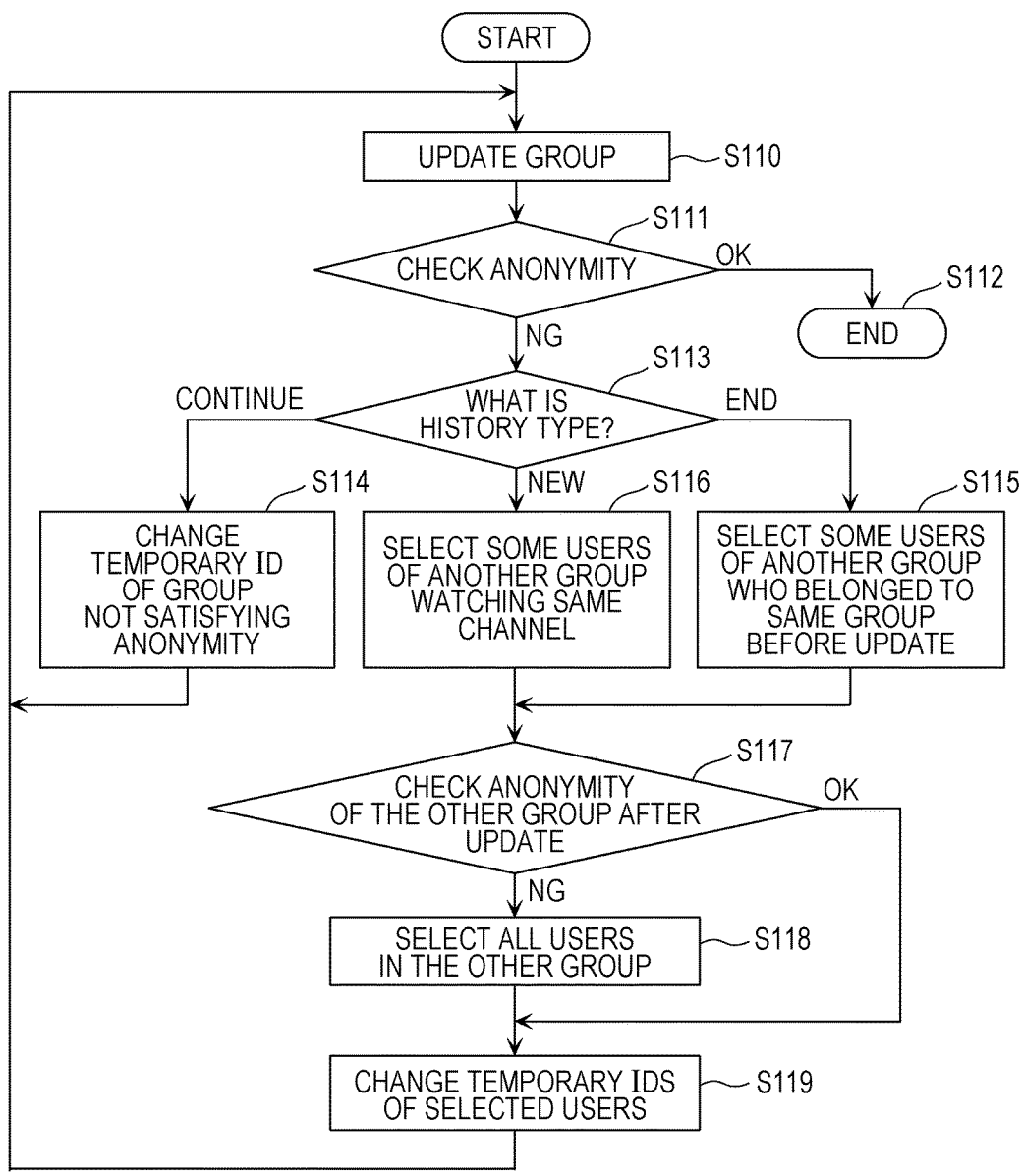
FIG. 10 is a flow chart of anonymization processing in the embodiment.

As shown in FIG. 10, the anonymization processing when the collection server 200 collects a watch history from the TV 100 differs, depending on three states of the user: the user continues to watch (Continued), the user has finished watching (Ended), or the user has started to watch (New).

The details of how the processing is performed depending on each state are described hereinafter.

[2.3.1 Processing when the User Continues to Watch TV 100 (Continued)]

Figure 11:
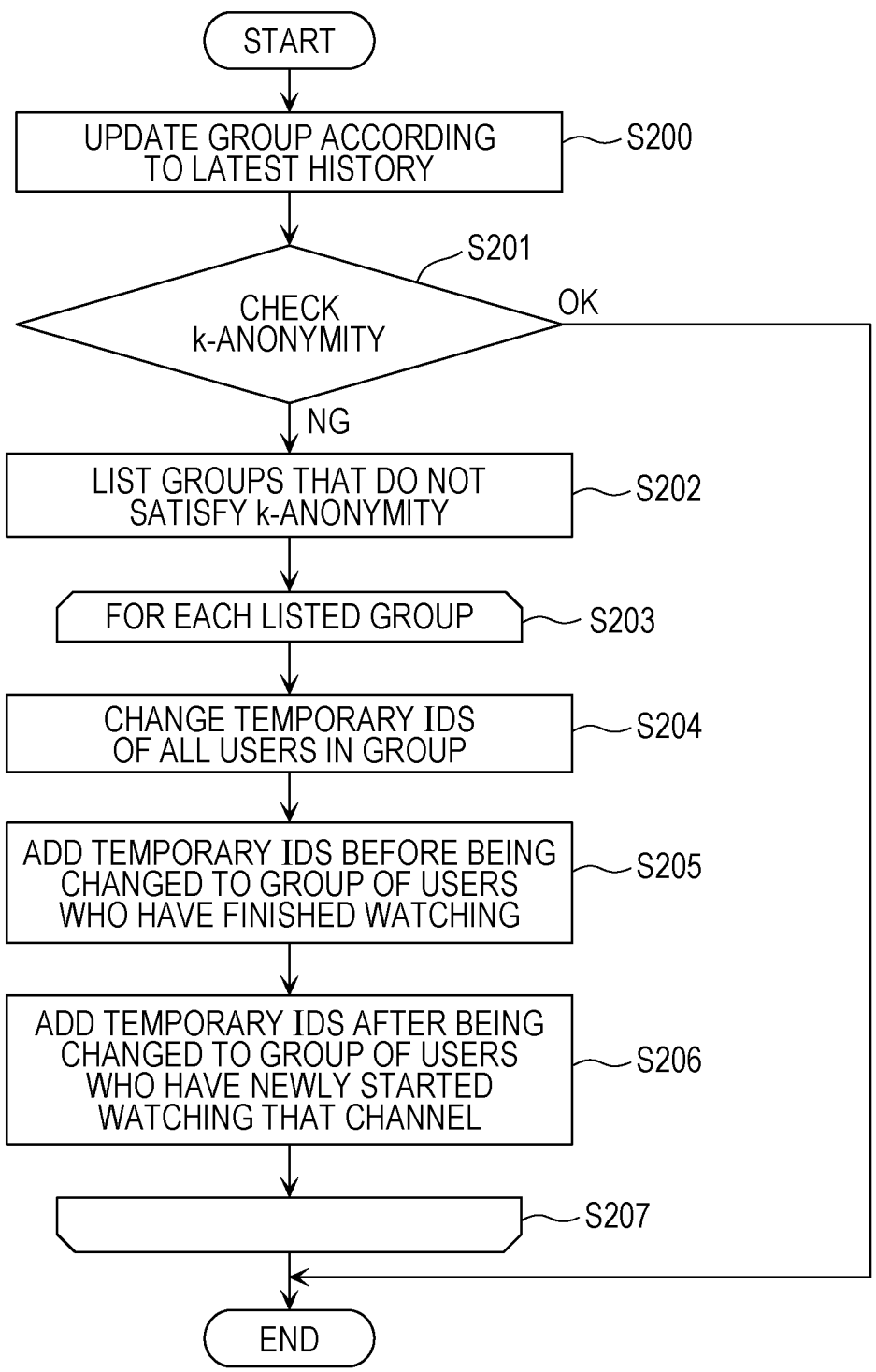
FIG. 11 is a flow chart of processing when a user continues to watch TV in the embodiment.

Details of the anonymization processing when the user continues to watch TV 100 (Continued) are described hereinafter with reference to FIG. 11.

The anonymization processor 250 updates a group ID 402 tied to each temporary ID 401, according to the latest watch history 404 (S200). Then, the anonymization processor 250 refers to the user management table 400, generates a new group by referring to a watch history 404 added after update processing of the group ID 402, in the temporary ID 401 that is assigned with the same group ID 402 and by collecting the temporary IDs 401 to which the same watch history 404 is added, and sets an individual group ID 402 to each group.

Then, the anonymization processor 250 checks whether or not the group satisfies k-anonymity, for each newly assigned group ID 402 (S201). Specifically, the anonymization processor 250 checks by seeing whether or not the number of users belonging to the same group (the number of temporary IDs 401 assigned with the same group ID 402) is equal to or more than k. When the number of users belonging to the same group is equal to or more than k in all groups, the anonymization processor 250 judges that the groups satisfy k-anonymity ("OK" in S201). When there is one or more groups in which the number of users belonging to the group is less than k, the anonymization processor 250 judges that the groups do not satisfy k-anonymity ("NG" in S201).

When the anonymization processor 250 judges "NG" in step S201, the anonymization processor 250 lists groups that do not satisfy k-anonymity (S202).

Next, the anonymization processor 250 performs the processing from step S203 to S207 on each group listed in step S202. Then, the groups listed in step S202 are all groups in a (Continued) state in which the users continue to watch TV 100.

First, the anonymization processor 250 changes all temporary IDs 401 in a target group (S204). Specifically, the anonymization processor 250 generates a new temporary ID 401 and adds the generated temporary ID 401 to the user management table 400. Then, the anonymization processor 250 copies the latest history of a watch history 404 of the temporary ID 401 at a change source to a watch history 404 of the newly generated temporary ID 401 to update the latest history of the watch history 404 of the temporary ID 401 of the change source to information that the user has finished watching TV 100 (Ended). With the processing described above, the anonymization processor 250 changes the temporary ID.

Then, the anonymization processor 250 changes the group ID 402 in the user management table 400 for the temporary ID 401 of the change source to the group ID 402 of the (Ended) group that has finished watching TV 100 and that has the same watch history 404 as the watch history 404 after updating of the temporary ID 401 (S205).

Then, the anonymization processor 250 changes the group ID 402 in the user management table 400 for the newly generated temporary ID 401 to the group ID 402 of the (new) group that has started to watch and that has the same watch history 404 as the watch history 404 of the temporary ID (S206).

On the one hand, when the anonymization processor 250 judges "OK" in step S201, the anonymization processor 250 finishes the processing.

[2.3.2. Processing when the User has Finished Watching TV 100 (Ended)]

Figure 12:
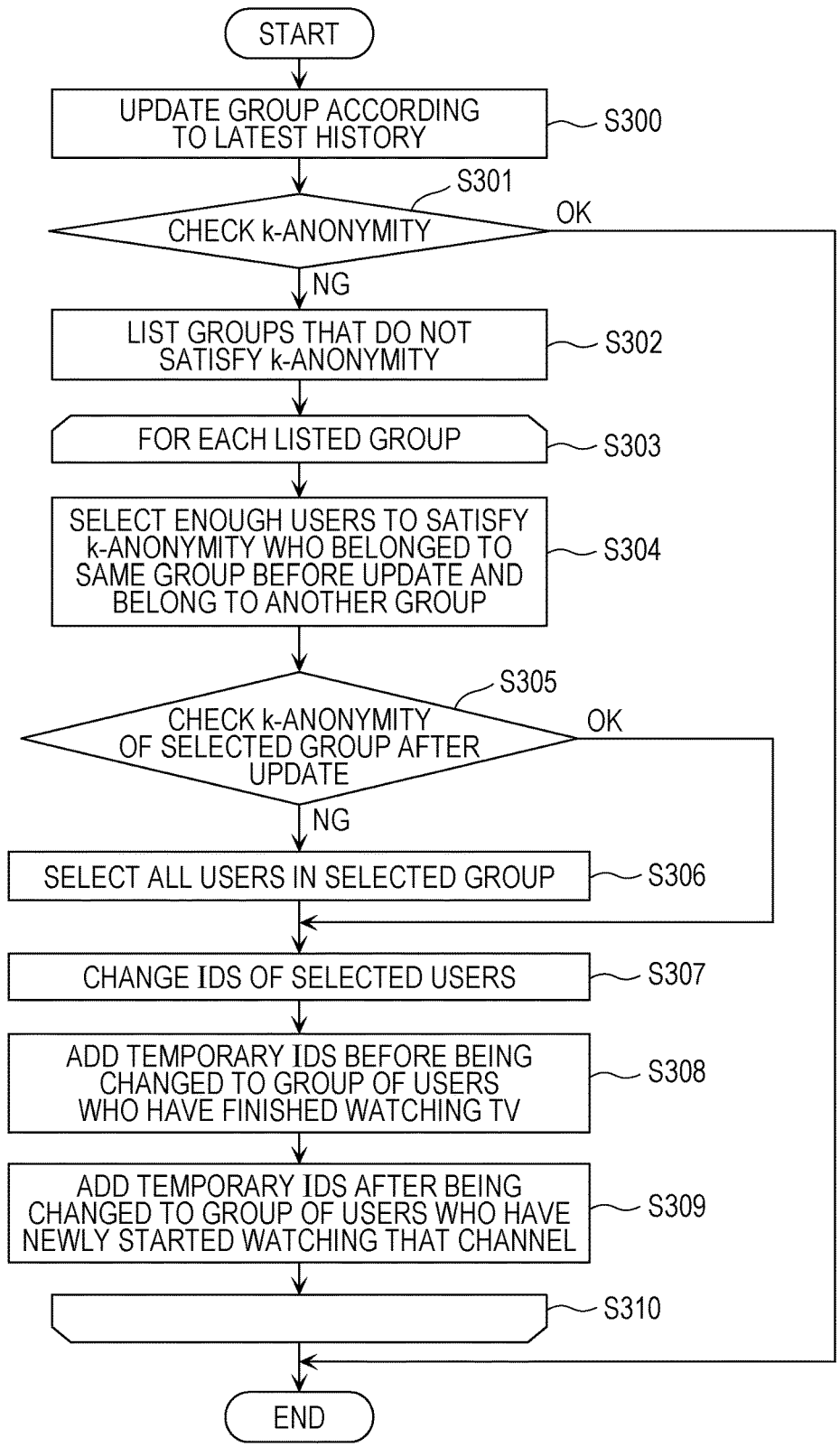
FIG. 12 is a flow chart of processing when the user finishes watching TV in the embodiment.

Details of the anonymization processing when the user has finished watching TV 100 (Ended) are described hereinafter with reference to FIG. 12.

The anonymization processor 250 updates a group ID 402 tied to each temporary ID 401, according to the latest watch history 404 (S300). Then, the anonymization processor 250 refers to the user management table 400, generates a new group by referring to a watch history 404 added after update processing of the last group ID 402, in the temporary ID 401 that is assigned with the same group ID 402 and by collecting the temporary IDs 401 to which the same watch history 404 is added, and sets an individual group ID 402 to each group.

Then, the anonymization processor 250 checks, for each newly assigned group ID 402, whether or not the group satisfies k-anonymity (S301). Note that details of the processing are similar to step 201 described above.

When the anonymization processor 250 judges "NG" in step S301, the anonymization processor 250 lists groups that do not satisfy k-anonymity (S302).

The anonymization processor 250 performs the processing from step S303 to S310 on each group listed in step S302. Then, the groups listed in step S302 are all in a (Ended) state in which the users have finished watching TV 100.

First, in order to secure enough users (suppose that the number of them is n) for a target group to satisfy k-anonymity, the anonymization processor 250 selects one group from a family of groups that were in the same group as the target group immediately before, and that now belong to a different group. Then, the anonymization processor 250 selects enough users for the target group to satisfy k-anonymity from the users in that selected group (S304). A method of selecting a group includes, for example, a method of selecting of a group to which the largest number of users belong, out of groups to which k+n or more users belong. Alternatively, it includes a method of selecting a group to which the smallest number of users belong, out of groups to which n or more users belong.

Then, the anonymization processor 250 checks whether or not the group selected in step S304 satisfies k-anonymity when the selected users are excluded therefrom (S305). Specifically, the anonymization processor 250 judges "OK" if k or more users belong to the group when the selected users are excluded from the selected group, and judges "NG" if only less than k users belong to the group.

When the anonymization processor 250 judges "NG" in step S305, the anonymization processor 250 selects temporary IDs 401 of all users (S306) of the group selected in step S304.

When the anonymization processor 250 judges "OK" in step S305, it proceeds to step S307.

The anonymization processor 250 changes the temporary ID 401 of the user selected in step S304 or step S306 (S307). The processing to change the temporary ID 401 is similar to step S204.

Then, the anonymization processor 250 changes the group ID 402 in the user management table 400 for the temporary ID 401 of the change source to the group ID 402 of the (Ended) group that has finished watching TV 100 and that has the same watch history 404 as the watch history 404 after update of the temporary ID (S308).

Then, the anonymization processor 250 changes the group ID 402 in the user management table 400 for the newly generated temporary ID 401 to the group ID 402 of the (New) group that has newly started to watch and that has the same watch history 404 as the watch history 404 after update of the temporary ID (S309).

[2.3.3 Processing when the User has Started to Watch TV 100 (New)]

Figure 13:
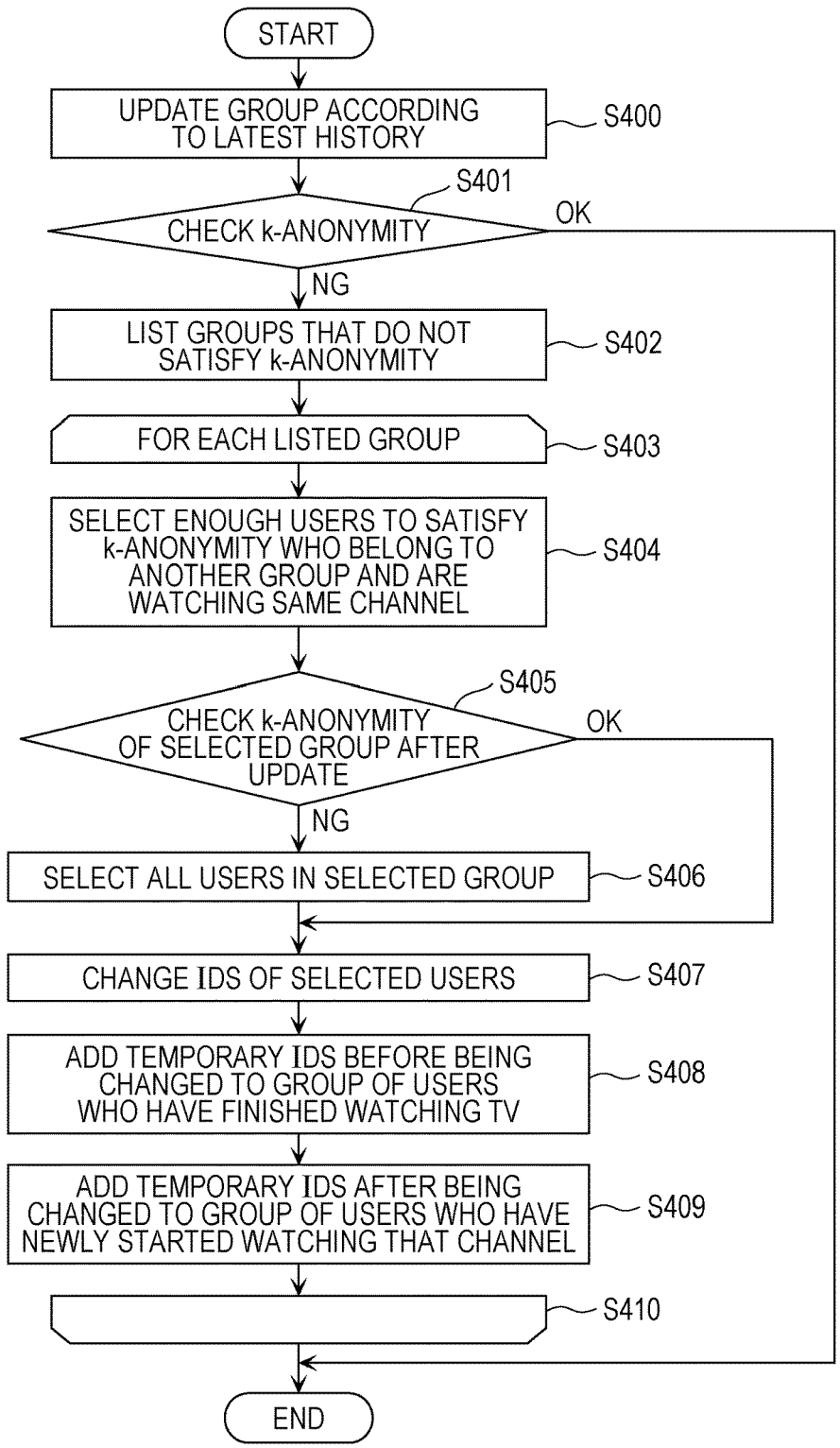
FIG. 13 is a flow chart of processing when the user starts watching TV in the embodiment.

Details of the anonymization processing when the user has started to watch TV 100 (New) are described hereinafter with reference to FIG. 13.

The anonymization processor 250 updates a group ID 402 tied to each temporary ID 401, according to the latest watch history 404 (S400). Then, the anonymization processor 250 refers to the user management table 400, generates a new group by referring to a watch history 404 added after update processing of the last group ID 402, in the temporary ID 401 that is assigned with the same group ID 402 and by collecting the temporary IDs 401 to which the same watch history 404 is added, and sets an individual group ID 402 to each group.

Then, the anonymization processor 250 checks whether or not the group satisfies k-anonymity for each newly assigned group ID 402 (S401). Note that details of the processing are similar to step S201 described above.

When the anonymization processor 250 judges "NG" in step S401, the anonymization processor 250 lists groups that do not satisfy k-anonymity (S402).

The anonymization processor 250 performs the processing from step S403 to S410 on each group listed in step S402. Then, the groups listed in step S402 are all groups in a (New) state in which the users have started to watch TV 100.

First, in order to secure enough users (suppose that the number of users is n) for a target group to satisfy k-anonymity, the anonymization processor 250 selects one group from a family of groups that are watching the same channel as the target group in the latest watch history 404 and selects enough users for the target group to satisfy k-anonymity, out of users in that selected group (S404).

Then, the anonymization processor 250 checks whether or not the group selected in step S404 satisfies k-anonymity when the selected users are excluded therefrom (S405). The anonymization processor 250 judges "OK" if k or more users belong to the group when the selected users are excluded from the selected group, and judges "NG" if only less than k users belong to the group.

When the anonymization processor 250 judges "NG" in step S405, the anonymization processor 250 selects temporary IDs 401 of all users of the group selected in step S404 (S406). Now, if the number of users necessary to satisfy k-anonymity is not reached even when the anonymization processor 250 selects all users in the group selected in step S404, the anonymization processor 250 judges that it does not transmit history information 201 and finishes the processing (not shown).

When the anonymization processor 250 judges "OK" in step S405, it proceeds to step S407.

The anonymization processor 250 changes the temporary ID 401 of the user selected in step S404 or step S406 (S407). The processing to change the temporary ID 401 is similar to step S204.

Then, the anonymization processor 250 changes the group ID 402 in the user management table 400 for the temporary ID 401 of the change source to the group ID 402 of the (Ended) group that has finished watching TV 100 and that has the same watch history 404 as the watch history 404 after update of the temporary ID (S408).

Then, the anonymization processor 250 changes the group ID 402 in the user management table 404 for the newly generated temporary ID 401 to the group ID 402 of the (New) group that has newly started to watch and that has the same watch history 404 as the watch history 404 after update of the temporary ID (S409).

[2.4 Specific Example of Anonymization Processing]

A specific example of how a watch history is anonymized is illustrated hereinafter based on the example of the watch history shown in FIG. 2.

Figure 15:
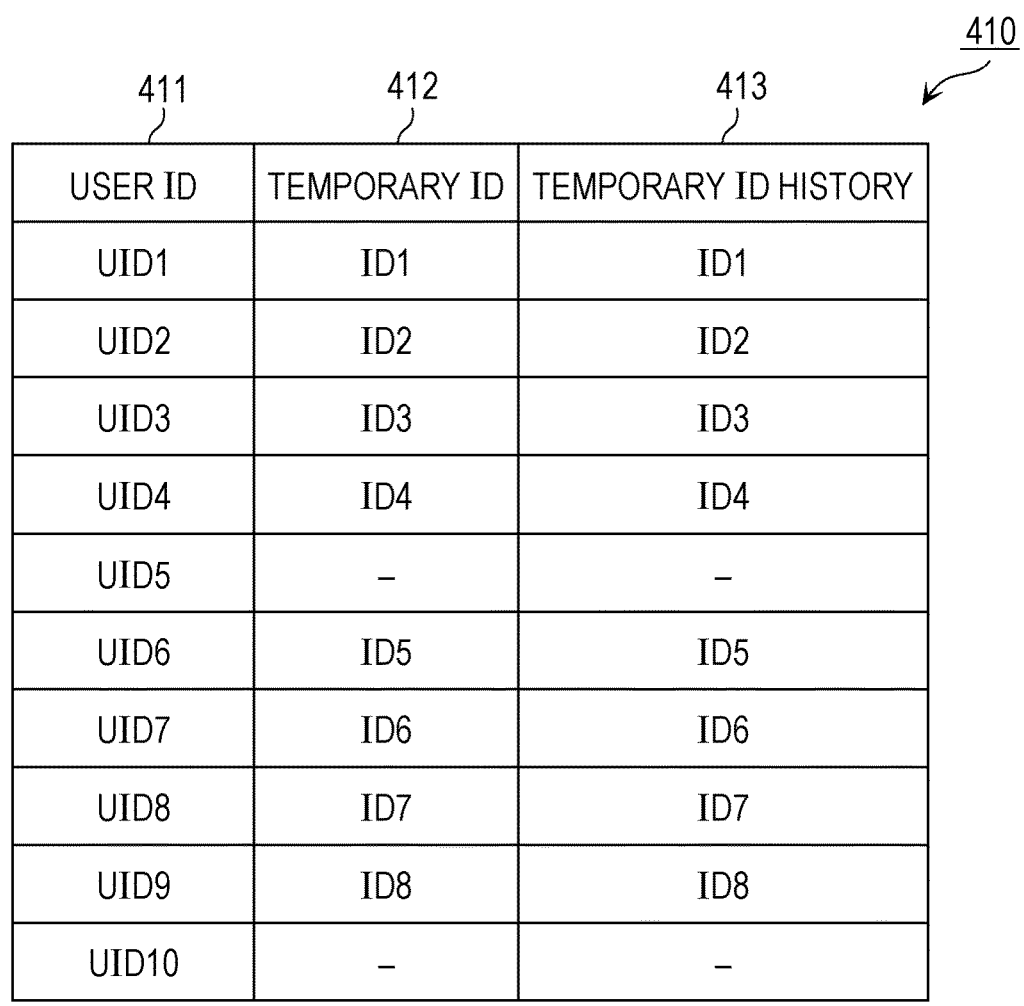
FIG. 15 is a view showing an example of an ID correspondence table at time t in the embodiment.

FIG. 14 shows an example of a watch history at time t. At this point in time, users whose user IDs are UID1, UID2, UID3, UID4, and UID6 are watching 2-channel, and users whose user IDs are UID7, UID8, and UID9 are watching 4-channel. In addition, users whose user IDs are UID5 and UID10 are not watching TV 100. FIG. 15 shows a correspondence relation of user IDs and temporary IDs 401 at this point in time.

FIG. 16 shows a user management table 400 at time t. In the user management table 400, corresponding to the ID correspondence table 410 of FIG. 15, a watch history 404 of a user ID corresponding to the temporary ID 401 is recorded in each row of the temporary ID 401.

The anonymization processing at time t is described according to the overall flow chart in FIG. 10.

First, the group updating unit 251 performs the processing to update the group in step S110. The group updating unit 251, as shown in the user management table 400 in FIG. 16, records group IDs 402 in the group ID 402 column, according to watch histories 404. In this example, since users whose temporary IDs 401 are ID1, ID2, ID3, ID4, and ID5 are watching 2-channel, the same group ID 402 (GID1) is recorded for these temporary IDs 401. In addition, since users whose temporary IDs 401 are ID6, ID7, ID8 are watching 4-channel, the same group ID 402 (GID2) is recorded for these temporary IDs 401.

Then, the anonymization verification unit 252 performs the processing to check k-anonymity in step S111. An example of a case in which k is "2" is described hereinafter. The anonymization verification unit 252 checks whether or not each group (in this case, groups of GID1 and GID2) satisfies k-anonymity. In this case, since both groups satisfy k-anonymity (k or more users are present), the anonymization verification unit 252 judges "OK" in step S111, and finishes the processing.

Since all data satisfies k-anonymity, the collection server 200 transmits history information 201 to, for example, the analysis server 300 or the like. Thus, the collection server 200 sets all transmission enabled/disabled flags 403 to "Enabled" in the user management table 400.

FIG. 17 shows an example of a watch history at time t+1. Then, the users whose user IDs are UID1, UID2, UID3, and UID4 have changed from 2-channel to 8-channel. In addition, the user whose user ID is UID5 newly starts to watch TV 100, and is watching 8-channel. The user whose user ID is UID6 has changed channels from 2-channel to 10-channel. The users whose user IDs are UID7, UID8, and UID9 have changed channels from 4-channel to 10-channel. The user whose user ID is UID10 has newly started to watch TV 100, and is watching 10-channel.

The anonymization processing at time t+1 is described with reference to the overall flow chart of FIG. 10.

First, the group updating unit 251 performs the processing to update a group in step S110. As shown in the user management table 400 in FIG. 18, the group updating unit 251 records a group ID 402 in the group ID 402 column, according to a watch history 404. In this example, since users whose temporary IDs 401 are ID1, ID2, ID3, and ID4 have changed channels from 2-channel to 8-channel, they are included in a single group, and the group ID 402 remains GID1. Unlike the users whose temporary IDs are ID1, ID2, ID3, and ID4, since the user with the temporary ID 401 of ID5 whose group ID 402 was GID1 at time t has changed channels from 2-channel to 10-channel, the group ID 402 is changed from GID1 to GID3. Furthermore, since the users whose temporary ID 401 are ID6, ID7, and ID8 have changed channels from 4-channel to 10-channel, they are included in a single group and the group ID 402 remains GID2. In addition, new temporary IDs 401 (ID9, ID10) are issued to the users (UID5, UID10) who have started to watch TV 100, and the watch history 404 is managed in the user management table 400. Since each of the users whose temporary IDs 401 are ID9 and ID10 and who have newly started to watch TV 100 starts to watch different channels (8-channel and 10-channel), they are assigned with different group IDs 402 (GID4, GID5).

In addition, the ID correspondence table 410 is updated. Specifically, the temporary ID 412 for which the user ID 411 is UID5 is set to ID9, and the temporary ID 401 for which the user ID 411 is UID10 is set to ID10.

Figure 19:
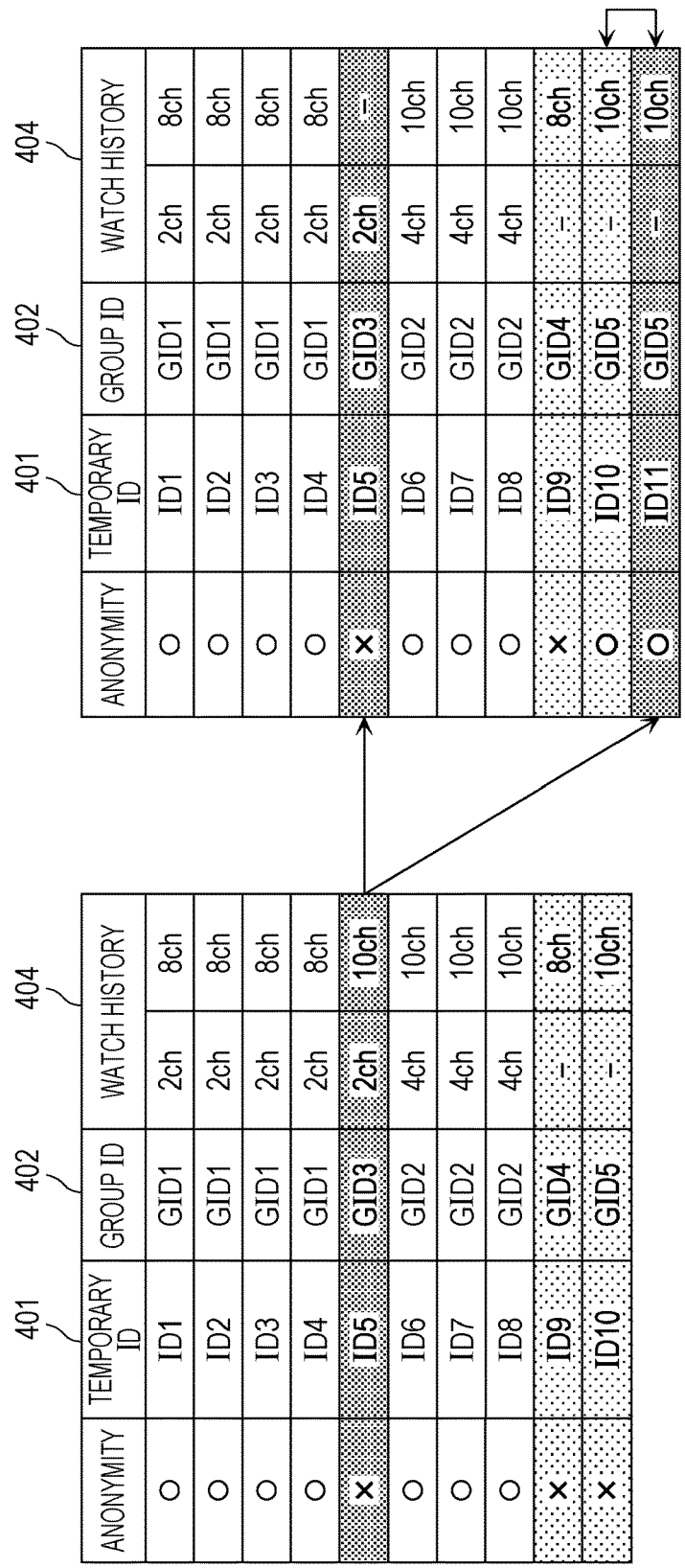
FIG. 19 is a view illustrating anonymization processing at time t+1 in the embodiment.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, and GID5) satisfies k-anonymity. In this case, as shown in FIG. 19, three groups with GID3, GID4, and GID5 do not satisfy k-anonymity. Thus, the anonymization verification unit 252 judges "NG" in step S111 and performs the processing subsequent to step S113.

The anonymization processor 250 first performs the processing on the group whose group ID 402 is GID3. The anonymization processor 250 judges a type of history information of the group with GID3 in step S113. Since users in the GID3 group continue to watch TV 100, the anonymization processor 250 judges "Continued" in step S113. Thus, the ID changing unit 253 changes the temporary ID 401 of the users belonging to the GID3 group (S114). Specifically, as shown in FIG. 19, the ID changing unit 253 issues a new temporary ID 401 (ID11), and writes, in the section of the watch history 404 whose temporary ID 401 is ID11, the information that the user is watching 10-channel, which is the latest history 404 of the user whose temporary ID 401 is ID5. In addition, the anonymization processor 250 erases from the watch history 404 whose temporary ID 401 is ID5 the information that the user is watching 10-channel, which is the latest history 404, and instead, records "-" which indicates that the user has finished watching TV 100, as the watch history 404 at time t+1.

Furthermore, the anonymization processor 250 updates the ID correspondence table 410. Specifically, for the UID6 user assigned ID5 as the temporary ID 401, the anonymization processor 250 records ID11, a new temporary ID 401, in the temporary ID 412 section in the ID correspondence table 413 and adds ID11 to the temporary ID history 413 section.

With the processing described above, as shown in FIG. 19, the temporary ID 401 is changed from ID5 to ID11.

The anonymization processor 250 returns the processing to step S110, and the group updating unit 251 performs the group update processing again. Since the watch history whose temporary IDs 401 are ID5 and ID11 is changed, these two temporary IDs 401 are also subject to the group update processing. The user with ID5 has a watch history 404 that the user watched 2-channel until time t and is no longer watching TV 100 at time t+1. Since there is no user having the same watch history 404, the group ID 402 remains GID3. On the one hand, the user with ID11 has a watch history that the user did not watch TV 100 at time t and has started to watch 10-channel at time t+1. Since the users whose temporary IDs 401 are ID10 and ID11 have the same watch history 404, the anonymization processor 250 sets to the user with ID11 the group ID 402 (GID5) identical to that of the ID10 user.

Figure 20:
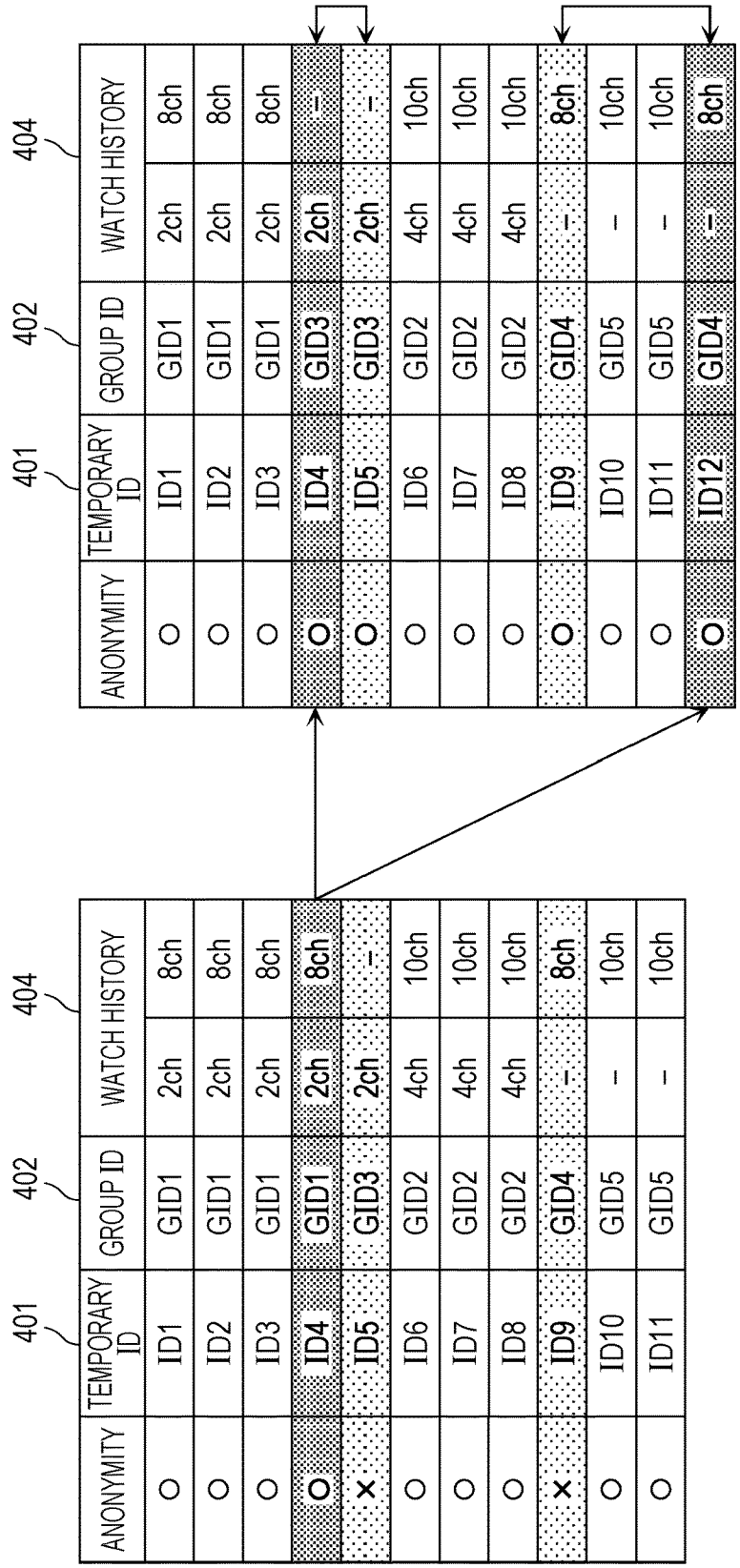
FIG. 20 is a view illustrating the anonymization processing at time t+1 in the embodiment.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, and GID5) satisfies k-anonymity. In this case, as shown in FIG. 20, two groups with GID3 and GID4 do not satisfy k-anonymity. Thus, the anonymization verification unit 252 judges "NG" in step S111 and performs the processing subsequent to step S113.

The anonymization processor 250 first performs the processing on the group whose group ID 402 is GID3. The anonymization processor 250 judges a type of history information of the group with GID3 in step S113. Since users in the GID3 group have finished watching TV 100, the anonymization processor 250 judges "Ended" in step S113.

The other-G-user selection unit 254 selects one group from the other groups having the same watch history 404 until the time t as the GID3, the target group, more specifically, other groups (in this case, the GID1 group) that were in the same group as the GID3 group until the group ID 402 was updated by the group update processing at time t+1, and selects enough users for the GID3 group to satisfy k-anonymity from the selected group (S115). In this case, in order for the GID3 group to satisfy k-anonymity, one more user is needed. Here, the other-G-user selection unit 254 selects users whose temporary ID 401 is ID4.

The other-G-user selection unit 254 inquires of the anonymization verification unit 252 whether or not the GID1 group satisfies k-anonymity when the user whose temporary ID 401 is ID4 is excluded from the GID1 group (S117). In this case, since the GID1 group satisfies k-anonymity even when the user whose temporary ID 401 is ID4 is excluded, the anonymization verification unit 252 returns "OK".

The ID changing unit 253 changes the temporary ID 401 of the selected user whose temporary ID 401 is ID4 (S119). Specifically, as shown in FIG. 20, the ID changing unit 253 issues a new temporary ID 401 (ID12), and writes, in the section of the watch history 404 whose temporary ID 401 is ID12, the information that the user is watching 8-channel, which is the latest watch history 404 of the user whose temporary ID 401 is ID4. The ID changing unit 253 erases, from the watch history 404 whose temporary ID 401 is ID4, the information that the user is watching 8-channel, which is the latest watch history 404, and instead records "-" indicating that the user has finished watching TV 100, as the watch history 404 at time t+1.

Furthermore, the anonymization processor 250 updates the ID correspondence table 410. Specifically, the anonymization processor 250 records ID12, which is a new temporary ID 401, in the temporary ID 412 section in the ID correspondence table 410, for the UID4 user assigned with ID4 as the temporary ID 401, and adds ID12 to the temporary ID history 413 section.

With the processing described above, as shown in FIG. 20, the temporary ID 401 is changed from ID4 to ID12.

The anonymization processor 250 returns the processing to step S110, and causes the group updating unit 251 to perform the group update processing again. Since the watch histories 404 whose temporary IDs 401 are ID4 and ID12 are changed, these two temporary IDs 401 are also subject to the group update processing. The user with ID4 has a watch history 404 that the user has watched 2-channel until the time t and is no longer watching TV 100 at time t+1. Since the user whose temporary ID is ID5 has the same watch history 404 as the ID4 user, the anonymization processor 250 sets to the ID4 user the group ID 402 (GID3) identical to that of the ID5 user. On the other hand, the ID12 user has a watch history 404 that the user did not watch TV 100 at time t and has started to watch 8-channel at time t+1. Since the user whose temporary ID 401 is ID9 has the same watch history 404 as the ID12 user, the anonymization processor 250 sets to the ID12 user the group ID 402 (GID4) identical to that of the ID9 user.

Then, the anonymization verification unit 252 performs the processing to check k-anonymity in step S111. The anonymization verification unit 252 checks whether or not each group (in this case, there are groups whose group IDs 402 are GID1, GID2, GID3, GID4, and GID5) satisfies k-anonymity. In this case, since all groups satisfy k-anonymity (k or more users are present), the anonymization verification unit 252 judges "OK" in step S111 and finishes the processing.

FIG. 21 shows the user management table 400 after the processing described above is performed. In addition, FIG. 22 shows the ID correspondence table 410 in this case.

FIG. 23 shows an example of a watch history at time t+2. The users whose user IDs are UID1, UID2, UID3, and UID4 have changed channels from 8-channel to 4-channel. In addition, the user whose user ID is UID5 has changed channels from 8-channel to 4-channel. The user whose user ID is UID6 has changed channels from 10-channel to 6-channel. The users whose user IDs are UID7, UID8, and UID9 have changed chancels from 10-channel to 6-channel. The user whose user ID is UID10 has changed the channel from 10-channel to 6-channel.

The anonymization processing at time t+2 is described with reference to the overall flow chart of FIG. 10.

First, the group updating unit 251 performs the processing to update a group in step S110. As shown in the user management table 400 in FIG. 24, the group updating unit 251 records a group ID 402 in the group ID 402 column, according to a watch history 404. In this example, since all users have changed channels similarly to other users in the same group, the group ID 402 is not updated.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, and GID5) satisfies k-anonymity. In this case, since all groups satisfy k-anonymity (k or more users are present), the anonymization verification unit 252 judges "OK" in step S111, and finishes the processing.

Since there is no change to the ID correspondence table 410, it remains the same as in FIG. 22.

FIG. 25 shows an example of a watch history at time t+3. The users whose user IDs are UID1, UID2, and UID3 have changed the channel from 4-channel to 7-channel. In addition, the user whose user ID is UID4 has finished watching TV 100. The user whose user ID is UID5 has changed channels from 4-channel to 7-channel. The users whose use IDs are UID6, UID7, and UID8 have changed channels from 6-channel to 8-channel. The user whose user ID is UID9 has changed channels from 6-channel to 7-channel. The user whose user ID is UID10 has changed channels from 6-channel to 8-channel.

The anonymization processing at time t+3 is described with reference to the overall flow chart of FIG. 10.

First, the group updating unit 251 performs the processing to update a group in step S110. As shown in the user management table 400 in FIG. 26, the group updating unit 251 records a group ID 402 in the group ID 402 column, according to a watch history 404. In this example, since the users whose temporary IDs 401 are ID1, ID2, and ID3 have changed channels from 4-channel to 7-channel, they are included in one group and the group ID 402 remains GID1. Since the users whose group ID 402 was GID3 at time t and whose temporary IDs 401 are ID4 and ID5 have not watch the TV 100 since then, the group ID 402 (GID3) remains unchanged. Since the users whose group ID 402 was GID2 at time t+2 and whose temporary IDs 401 are ID6 and ID7 have changed channels from 6-channel to 8-channel, they are included in a single group and the group ID 402 remains GID2. On the one hand, unlike the users whose temporary IDs 401 are ID6 and ID7, since the user whose group ID 402 was GID2 at time t+2 and whose temporary ID 401 is ID8 has changed channels from 6-channel to 7-channel, the group ID 401 is changed from GID2 to GID6.

The user whose temporary ID 401 is ID9 has changed channels from 4-channel to 7-channel and the group ID remains GID4. Meanwhile, since the user whose group ID was also GID4 and whose temporary ID 401 is ID 12 has finished watching TV 100, the group ID 402 is changed from GID4 to GID 7. Since the users whose temporary IDs 401 are ID10 and ID11 have both changed channels from 6-channel to 8-channel, the group ID 402 remains GID5.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, GID5, GID6, and GID7) satisfies k-anonymity. In this case, as shown in FIG. 27, the three groups with GID4, GID6, and GID7 do not satisfy k-anonymity. Thus, the anonymization verification unit 252 judges "NG" in step S111 and performs the processing subsequent to step S113.

The anonymization processor 250 first performs the processing on the group whose group ID 402 is GID4. The anonymization processor 250 judges a type of history information of the group with GID4 in step S113. Since users in the GID4 group continue to watch TV 100, the anonymization processor 250 judges "Continued" in step S113. Thus, the ID changing unit 253 changes the temporary ID 401 of users belonging to the GID4 group (S114). Specifically, the anonymization processing unit 250 issues a new temporary ID 401 (ID13), and writes, in the section of the watch history 404 whose temporary ID 401 is ID13, the information that the user is watching 7-channel, which is the latest watch history 404 of the user whose temporary ID 401 is ID9. The anonymization processor 250 erases the information that the user is watching 7-channel, which is the latest watch history 404, for the watch history 404 whose temporary ID 401 is ID9, and instead, records "-" which indicates that the user has finished watching TV 100, as the watch history 404 at time t+3.

Furthermore, the anonymization processor 250 updates the ID correspondence table 410. Specifically, for the UID5 user assigned with ID9 as the temporary ID 401, the anonymization processor 250 records ID13, which is a new temporary ID 401, in the temporary ID 412 section in the ID correspondence table 410, and adds ID13 to the temporary ID history 413 section.

With the processing described above, as shown in FIG. 27, the temporary ID 401 is changed from ID9 to ID13.

The anonymization processor 250 returns the processing to step S110, and causes the group updating unit 251 to perform the group update processing again. Since the watch histories 404 whose temporary IDs 401 are ID9 and ID13 are changed, these two temporary IDs 401 are also subject to the group update processing. The user whose temporary ID 401 is ID9 has a watch history 404 that the user has watched 8-channel and 4-channel until the time t+2 and is no longer watching TV 100 at time t+3. Since the user whose temporary ID 401 is ID12 has the same watch history 404 as the ID9 user, the anonymization processor 250 sets to the ID12 user the group ID 401 (GID4) identical to that of the user with ID9. The user whose temporary ID 401 is ID13 has a watch history that the user has started to watch 7-channel at time t+3. Since there is no other user who has the same watch history 404 as ID13, the anonymization processor 250 sets GID7 to the group ID 402.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, GID5, GID6, and GID7) satisfies k-anonymity. In this case, as shown in FIG. 28, the two groups with GID6 and GID7 do not satisfy k-anonymity. Thus, the anonymization verification unit 252 judges "NG" in step S111 and performs the processing subsequent to step S113.

The anonymization processor 250 first performs the processing on the group whose group ID 402 is GID6. The anonymization processor 250 judges a type of history information of the group with GID6 in step S113. Since the users in the GID6 group continue to watch TV 100, the anonymization processor 250 judges "Continued" in step S113. Thus, the ID changing unit 253 changes the temporary ID 401 of the user belonging to the GID6 group (S114). Specifically, the anonymization processing unit 250 issues a new temporary ID 401 (ID14), and writes, in the section of the watch history 404 whose temporary ID 401 is ID14, the information that the user is watching 7-channel, which is the latest watch history 404 of the user whose temporary ID 401 is ID8. The anonymization processor 250 erases the information that the user is watching 7-channel, which is the latest watch history 404, for the watch history 404 whose temporary ID 401 is ID8, and instead, records "-" which indicates that the user has finished watching TV 100, as the watch history 404 at time t+3.

Furthermore, the anonymization processor 250 updates the ID correspondence table 410. Specifically, for the UID9 user assigned with ID8 as the temporary ID 401, the anonymization processor 250 records ID14, which is a new temporary ID 401, in the temporary ID 412 section in the ID correspondence table 410, and adds ID14 to the temporary ID history 413 section.

With the processing described above, as shown in FIG. 28, the temporary ID 401 is changed from ID8 to ID14.

The anonymization processor 250 returns the processing to step S110, and causes the group updating unit 251 to perform the group update processing again. Since the watch histories 404 whose temporary IDs 401 are ID 8 and ID 14 are changed, these two temporary IDs 401 are also subject to the group update processing. The user whose temporary ID 401 is ID8 has a watch history 404 that the user has watched 4-channel, 10-channel, and 6-channel until the time t+2 and is no longer watching TV 100 at time t+3. Since there is no other user who has the same watch history 404 as ID8, the group ID 402 remains GID6. The user whose temporary ID 401 is ID14 has a watch history 404 that the user has started to watch 7-channel at time t+3. Since the user whose temporary ID 401 is ID13 has the same watch history 404 as the ID14 user, the anonymization processor 250 sets to the ID14 user the group ID 402 (GID7) identical to that of the ID13 user. The user management table 400 after the setting is as shown in FIG. 29.

Subsequently, the anonymization verification unit 252 performs the processing to check k-anonymity in step S111. The anonymization verification unit 252 checks whether or not each group (in this case, there are groups whose group IDs 402 are GID1, GID2, GID3, GID4, GID5, GID6, and GID7) satisfies k-anonymity. In this case, the group with GID6 does not satisfy k-anonymity. Thus, the anonymization verification unit 252 judges "NG" in step S111 and performs the processing subsequent to step S113.

The anonymization processor 250 first performs the processing on the group whose group ID 402 is GID6. The anonymization processor 250 judges a type of history information of the group with GID6 in step S113. Since the user in the GID6 group has finished watching TV 100, the anonymization processor 250 judges "Ended" in step S113.

The other-G-user selection unit 254 selects one group from other groups having the same watch history 404 until the time t+2 as the GID6 group, the target group, more specifically, other groups (in this case, the GID2 group) that were in the same group as the GID6 group until the group ID 402 was updated by the group update processing at time t+3, and selects enough users for the GID6 group to satisfy k-anonymity from the selected group (S115). In this case, in order for the GID 6 group to satisfy k-anonymity, one more user is need. Here, the other-G-user selection unit 254 selects users whose temporary ID 401 is ID7.

The other-G-user selection unit 254 inquires of the anonymization verification unit 252 whether or not the GID2 group satisfies k-anonymity when the user whose temporary ID 401 is ID7 is excluded from the GID2 group (S117). In this case, since the GID2 group cannot satisfy k-anonymity when the user whose temporary ID 401 is ID7 is excluded, the anonymization verification unit 252 returns "NG".

Since "NG" is judged in step S117, the other-G-user selection unit 254 performs the processing to select all users in step S118. Here, the other-G-user selection unit 254 also selects the user whose temporary ID 401 is ID6 and who is a remaining member whose group ID 402 is GID2.

The ID changing unit 253 changes the temporary IDs 401 of the users whose selected temporary IDs 401 are ID6 and ID7 (S119). Specifically, as shown in FIG. 29, the ID changing unit 253 issues two new temporary IDs 401 (ID15 and ID16), and writes, in the section of the watch history 404 whose temporary IDs 401 are ID15 and ID16, the information that the users are watching 8-channel, which is the latest watch history 404 of the users whose temporary IDs 401 are ID6 and ID7. For the watch histories 404 whose temporary IDs 401 are ID6 and ID7, the ID changing unit 253 erases the information that the users are watching 8-channel, which is the latest watch history 404, and instead records "-" indicating that the users have finished watching TV 100, as the watch histories 404 at time t+3.

Furthermore, the anonymization processor 250 updates the ID correspondence table 410. Specifically, the anonymization processor 250 records ID15, which is a new temporary ID 401, in the temporary ID 412 section in the ID correspondence table 410, for the UID7 user assigned with ID6 as the temporary ID 401, and adds ID15 to the temporary ID history 413 section. Furthermore, for the UID8 user assigned with ID7 as the temporary ID 401, the anonymization processor 250 records ID16 which is a new temporary ID 401, in the temporary ID 412 section in the ID correspondence table 410 and adds ID16 to the temporary ID history 413 section.

With the processing described above, as shown in FIG. 29, the temporary IDs 401 are changed from ID6 and ID7 to ID15 and ID16, respectively.

The anonymization processor 250 returns the processing to step S110, and causes the group updating unit 251 to perform the group update processing again. Since the watch histories 404 whose temporary IDs 401 are ID6, ID7, ID15, and ID16 are changed, these four temporary IDs 401 are also subject to the group update processing. The user whose temporary ID 401 is ID6 has a watch history 404 that the user has watched 4-channel, 10-channel, and 6-channel until the time t+2 and is no longer watching TV 100 at time t+3. Since the user whose temporary ID 401 is ID7 has the same watch history 404 as the ID8 user, the anonymization processor 250 sets to the ID8 user the group ID 402 (GID2) identical to that of the ID7 user. The user whose temporary ID 401 is ID15 has a watch history 404 that the user has started to watch 8-channel at time t+3. Since the user whose temporary ID 401 is ID16 has the same watch history 404 as the ID15 user, the anonymization processor 250 sets the same group ID 402 (GID6) to the users whose temporary IDs 401 are ID15 and ID16.

Then, the anonymization verification unit 252 performs the processing to check k-anonymity in step S111. The anonymization verification unit 252 checks whether or not each group (in this case, there are groups whose group IDs 402 are GID1, GID2, GID3, GID4, GID5, GID6, and GID7) satisfies k-anonymity. In this case, since all groups satisfy k-anonymity (k or more users are present), the anonymization verification unit 252 judges "OK" in step S111 and finishes the processing.

FIG. 30 shows the user management table 400 after the processing described above has been performed. In addition, FIG. 31 shows the ID correspondence table 410 in this case.

3. Other Variations

Note that while the present disclosure is described based on the embodiments described above, it is a matter of course that the present disclosure is not limited to any of the embodiments described above. The following cases are also included in the present disclosure.

Figure 32:
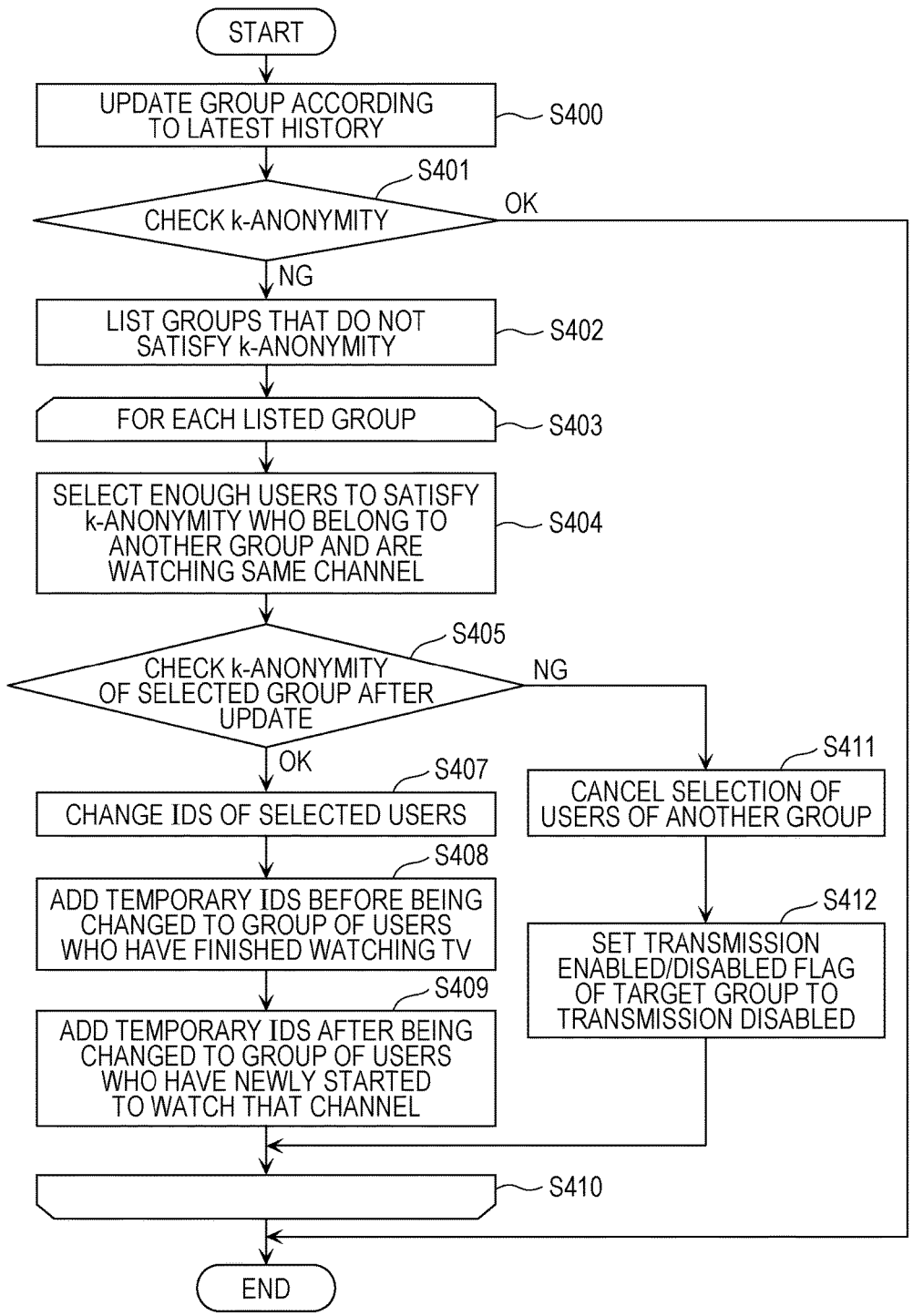
FIG. 32 is a flow chart in a variation in which a user starts to watch TV.

(1) In the embodiments described above, when "NG" is judged in step S401 in FIG. 13 and when "NG" is judged in step S405 in FIG. 13, the collection server 200 can transmit a watch history 404 to the analysis server 300, whenever possible, by selecting users in another group and changing IDs of the selected users. However, the embodiments are not limited to the processing above. For example, as shown in FIG. 32, selection of once selected users may be cancelled so that the watch history 404 may not be transmitted.

Specifically, when "NG" is judged in step S405, the collection server 200 cancels the selection of the users in the group made in step S404 (S411). Then, the collection server 200 sets the transmission enabled/disabled flag 403 of a target group that does not satisfy k-anonymity to transmission disabled (S412). With this, a watch history 404 of the target group is set not to be transmitted.

(2) In the above embodiments, while the collection server 200 collects channels being watched by users as history information, the embodiment is not limited to this. For example, the collection server 200 may collect as history information a state in which a user is switching channels in a short period of time, such as when the user cannot decide what channel to watch. In addition, the collection server 200 regards such a state as watching a special channel, and may collect, as history information, information on any channel other than the actual channels. More specifically, when the interval of changing a watch history is shorter than a threshold, the collection server 200 changes the watch history to history information indicating that the user is watching the special channel. With this, even if a user is actually selecting different channels, the collection server 200 can consider that the user has constant history information, which can reduce changing of a temporary ID 401.

For example, when channels are switched in a short period of time as with ID6 and ID7 shown in FIG. 33, a watch history 404 indicating a special state is set. In addition, a temporary ID 401 having the same watch history 404 including this special state is assigned to the same group.

(3) In a specific example of anonymization processing of the embodiments described above, the collection server 200 performs the processing subsequent to step S113, starting with the group with the smallest group ID, out of the groups that do not satisfy anonymity, However the embodiment is not limited to this. For example, the collection server 200 may perform the processing, starting with the group with the largest ID 402 or may perform the processing in any order. In addition, the collection server 200 may perform the processing, starting with the group that includes the user with the smallest temporary ID 401, out of the users included in all groups, or may perform the processing starting with the group including the user with the largest temporary ID 401. Furthermore, the collection server may perform the processing in the order of groups whose history type is judged as "Continued" in step S113, groups whose history type is judged as "Ended", and groups whose history type is judged as "New" or in the order of groups whose history type is judged as "Continued" in step S113, groups whose history type is judged as "New", and groups whose history type is judged as "Ended".

(4) In the specific example of anonymization processing of the embodiments described above, while the collection server 200 returns to step S110 every time it performs processing on one group in the processing subsequent to step S113, the embodiment is not limited to this. The collection server 200 may return to step S110 after performing processing on all groups judged not to satisfy anonymity in step S111.

In addition, the collection server 200 may perform processing for each history type judged in step S113. For example, after performing processing on all groups judged as "Continued" in step S113, the collection server 200 returns to step S110. When there is no group judged as "Continued" in step S113, the collection server 200 performs processing on all groups judged as "Ended", and then returns to step S110. Naturally, the order in which the collection server performs processing on groups of any history type such as "Continued", "Ended", or the like may be any order other than this.

With this, the collection server 200 can finish processing with a smaller number of repetitions.

(5) In the specific example of anonymization processing of the embodiments described above, when the other-group-user selection unit 254 selects a group, only one group targeted for selection is present. However, when a plurality of groups targeted for selection are present, the collection server 200 performs the following processing. For example, the collection server 200 may select the group with the smallest group ID 402 or the group with the largest group ID, out of the groups targeted for selection. Alternatively, the collection server 200 may determine a group to select based on the number of users included in a group. For example, the collection server 200 may select the group having the largest number of users, the group having users whose number is equal to or more than the necessary number of users and whose number is closest to the necessary number of users, or any group from the groups that can satisfy anonymity even if the necessary number of users are excluded. Furthermore, the collection server 200 may determine a group to select based on history information. For example, the collection server 200 may select a group for which there exists any other group that has only history information which is the same as the latest history information or a group for which there exists any other group that has only history information which is the same as any history information other than the latest history information.

Since this allows the collection server 200 to select a group so that the number of users whose IDs are changed may be smaller, it can leave useful information for analysis.

(6) In the embodiments described above, while the example in which all users change channels simultaneously is described, the embodiment is not limited to this, and some users may not have to change channels. In addition, the user may change channels at any time and this information may be transmitted as history information. In this case, the collection server 200 may process the history information so that channels may be changed at a certain interval.

(7) In the embodiments described above, while the example in which a watch history is information on a channel being watched, the embodiment is not limited to this, and the watch history may be information indicating the name of a program being watched.

(8) Each of the devices described above may be a computer system including, specifically, a microprocessor, a ROM, a RAM, a hard disk unit, a display unit, a keyboard, and a mouse or the like. In the RAM or the hard disk unit is stored a computer program. The microprocessor operates according to the computer program, and thereby each device achieves its function. Here, the computer program is configured with a combination of a plurality of instruction codes that indicate a command to the computer, in order to achieve a predetermined function.

(9) A part of all of components that constitute each of the devices described above may be composed of one system large scale integration (LSI) circuit. The system LSI is a super-multifunctional LSI manufactured with integrated a plurality of components on one chip, and is a computer system including, specifically, a microprocessor, a ROM, a RAM, or the like. In the RAM is recorded a computer program. The microprocessor operates according to the computer program, and thereby the system LSI achieves its function.

In addition, each of the components that constitute the devices described above may individually be one chip or may be one chip so that some or all of the components are included.

In addition, here, the circuit is referred to as a system LSI, it may be designated as an IC, a super-LSI, or an ultra-LSI, depending on difference in the degree of integration. In addition, a technique to make an integrated circuit is not limited to LSI, and may be implemented by a dedicated circuit or a general-purpose processor. A field programmable gate array (FPGA) that can be programmed after an LSI is manufactured or a reconfigurable processor capable of reconfiguring connection or configuration of a circuit cell within an LSI may also be utilized.

Furthermore, with advances in the semiconductor technology or different technologies derived therefrom, if an integrated circuit technology that will replace the LSI emerges, naturally, integration of functional blocks may be performed through the use of that technology. It may be that application of a biological technology or the like is possible.

(10) Some or all of the components that constitute each of the devices described above may be composed of an IC card that is detachable from each device or of a stand-alone module. An IC card or a module is a computer system composed of a microprocessor, a ROM, a RAM, or the like. The IC card or the module may include the super-multi-functional LSI mentioned above. The microprocessor operates according to a computer program, and thereby the IC card or the module achieves their functions. The IC card or the module may have the tamper-proof property.

(11) The present disclosure may be methods described above. Alternatively, the present disclosure may be a computer program that implements these methods by a computer or a digital signal composed of a computer program.

In addition, the present disclosure may be a recording of a computer program or a digital signal stored in a computer readable recording medium, such as a flexible disk, a hard disk, a CD-ROM, an MO, a DVD, a DVD-ROM, a DVD-RAM, a BD (Blu-ray (Registered Trademark) Disc), a semiconductor memory, or the like. In addition, the present disclosure may be the digital signal stored in these recording media.

In addition, the present disclosure may transmit a computer program or a digital signal via a telecommunication line, a wireless or wired communication line, a network represented by the Internet, data broadcasting or the like.

In addition, the present disclosure may be a computer system including a microprocessor and a memory, the memory recording the computer program mentioned above, and the microprocessor operating according to a computer program.

In addition, the present disclosure may be implemented by other independent computer systems, by transferring a program or a digital signal recorded in a recording medium or by transferring the program or the digital signal via a network or the like.

(12) The embodiments and variations described above may be combined.

So far while the history information anonymization device according to one or more aspects is described based on the embodiments, the present disclosure shall not be limited to these embodiments. A configuration in which variations that occur to those skilled in the art are applied to the embodiments or that are constructed by combining components in different embodiments may fall within the one or more aspects as long as they do not depart from the intent of the present disclosure.

The present disclosure is capable of anonymization of history information without changing an ID as much as possible, with k-anonymity satisfied, in a system for anonymizing history information. The present disclosure is useful as a history information provision system to third parties, or the like.

What is claimed is:

1. A history information anonymization method for protecting an identity of a user having a plurality of user devices connected to an external communication network by anonymizing a plurality of pieces of history information periodically collected by a collection server from a plurality of user devices prior to transmitting history information to an analysis server, comprising:

collecting, by the collection server during a current cycle, the plurality of pieces of history information from the plurality of user devices;

associating each of the plurality of pieces of history information collected from the plurality of user devices in the current cycle with an ID associated with a user device in the plurality of user devices;

grouping the plurality of IDs into a plurality of groups such that contents of the associated plurality of pieces of history information in the current cycle and in a past cycle are identical for the IDs in each group;

judging whether each of the plurality of groups satisfies anonymity, wherein a group is judged to satisfy anonymity when the number of the plurality of IDs included in the group is equal to or more than predetermined k (a positive integer equal to or more than 2), and the group is judged not to satisfy anonymity when the number of the plurality of IDs included in the group is less than k; and when it is judged that any of the plurality of groups does not satisfy anonymity, selecting an ID included in a second group different from a first group that is judged not to satisfy anonymity, such that changing the selected ID causes the first group to satisfy anonymity, changing one of the plurality of IDs included in the first group to the selected ID, changing an association of one of the plurality of pieces of history information with the one of the plurality of IDs included in the first group to the selected ID, and changing all IDs included in the second group if anonymity of the second group cannot be maintained when part of the selected ID included in the second group is changed; and when it is judged that the plurality of groups satisfies anonymity by the collection server, transmitting the anonymized plurality of pieces of history information to the analysis server.

2. The history information anonymization method according to claim 1, wherein the selecting comprises selecting an ID included in the second group such that anonymity of the second group is maintained.

3. The history information anonymization method according to claim 1, wherein the selecting comprises, when the plurality of pieces of history information of the first group in the current cycle indicates that the user device is not used, selecting the second group whose the plurality of pieces of history information in the past cycle excluding the history information in the current cycle is the same as that of the first group, and selecting an ID included in the second group.

4. The history information anonymization method according to claim 1, wherein the selecting includes, when the plurality of pieces of history information of the first group in the past cycle excluding the plurality of pieces of history information in the current cycle indicate that the user device is not used, selecting the second group whose the plurality of pieces of history information in the current cycle are the same as that of the first group and selecting the ID included in the second group.

5. The history information anonymization method according to claim 1, wherein each of the plurality of pieces of history information is classified as (i) "continuation" when a user continues to watch a television, (ii) "termination" when the user terminates to watch the television, and (iii) "start" when the user starts to watch the television.

6. The history information anonymization method according to claim 5, further comprising:

changing a classification of one of the plurality of pieces of history information from any of "continuation", "termination", and "start" to a "special status" when an interval of changing the watch history is shorter than a threshold.

7. A history anonymization device for protecting an identity of a user having a plurality of user devices connected to an external communication network by anonymizing a plurality of pieces of history information periodically collected by a collection server from a plurality of user devices prior to transmitting history information to an analysis server, comprising:

a processor; and a non-transitory memory having stored therein instructions which, when executed by the processor, cause the processor to perform operations, including:

collecting, by the collection server during a current cycle, the plurality of pieces of history information from the plurality of user devices;

associating each of the plurality of pieces of history information collected from the plurality of user devices in the current cycle with an ID associated with a user device in the plurality of user devices;

grouping the plurality of IDs into a plurality of groups such that contents of the associated plurality of pieces of history information in the current cycle and in a past cycle are identical for the IDs in each group;

judging whether each of the plurality of groups satisfies anonymity, wherein a group is judged to satisfy anonymity when the number of the plurality of IDs included in the group is equal to or more than predetermined k (a positive integer equal to or more than 2), and the group is judged not to satisfy anonymity when the number of the plurality of IDs included in the group is less than k; and when it is judged that any of the plurality of groups does not satisfy anonymity, selecting an ID included in a second group different from a first group that is judged not to satisfy anonymity, such that changing the selected ID causes the first group to satisfy anonymity, changing one of the plurality of IDs included in the first group to the selected ID, changing an association of one of the plurality of pieces of history information with the one of the plurality of IDs included in the first group to the selected ID, and changing all IDs included in the second group if anonymity of the second group cannot be maintained when part of the selected ID included in the second group is changed; and when it is judged that the plurality of groups satisfies anonymity by the collection server, transmitting the anonymized plurality of pieces of history information to the analysis server.

8. The history information anonymization method according to claim 5, wherein the selecting includes, when the plurality of pieces of history information of the first group in the current cycle indicates "termination", selecting the second group whose the plurality of pieces of history information in the past cycle excluding the history information in the current cycle is the same as that of the first group, and selecting the ID included in the second group, and when the plurality of pieces of history information of the first group in the current cycle indicates "start", selecting the second group whose the plurality of pieces of history information in the current cycle are the same as that of the first group, and selecting the ID included in the second group.

\* \* \* \* \*